(12) United States Patent
Averill et al.

(10) Patent No.: US 10,228,026 B2
(45) Date of Patent: Mar. 12, 2019

(54) MOTORIZED DISCONNECT SYSTEM AND OPERATION METHODS

(71) Applicant: WARN AUTOMOTIVE, LLC, Milwaukie, OR (US)

(72) Inventors: Bryan Averill, Portland, OR (US); Oliver Heravi, Beaverton, OR (US)

(73) Assignee: Warn Automotive, LLC, Milwaukie, OR (US)

( * ) Notice: Subject to any disclaimer, the term of this patent is extended or adjusted under 35 U.S.C. 154(b) by 0 days.

(21) Appl. No.: 15/488,255

(22) Filed: Apr. 14, 2017

(65) Prior Publication Data

US 2017/0234369 A1    Aug. 17, 2017

Related U.S. Application Data

(63) Continuation of application No. 14/678,245, filed on Apr. 3, 2015, now Pat. No. 9,556,543.
    (Continued)

(51) Int. Cl.

| | | |
|---|---|---|
| *F16D 11/14* | (2006.01) | |
| *F16D 23/12* | (2006.01) | |
| *F16D 28/00* | (2006.01) | |
| *B60K 23/08* | (2006.01) | |
| *F16D 23/04* | (2006.01) | |

(Continued)

(52) U.S. Cl.
CPC .............. *F16D 11/14* (2013.01); *B60K 23/08* (2013.01); *F16D 23/12* (2013.01); *F16D 28/00* (2013.01); *B60Y 2300/429* (2013.01); *B60Y 2400/405* (2013.01); *B60Y 2400/421* (2013.01); *B60Y 2400/82* (2013.01); *F16D 23/04* (2013.01); *F16D 2011/002* (2013.01);
(Continued)

(58) Field of Classification Search
CPC ......... B60K 23/08; F16D 11/14; F16D 23/12; F16D 28/00; F16D 23/04; F16D 2011/002; F16D 2300/18; F16D 2023/123; F16H 1/16
See application file for complete search history.

(56) References Cited

U.S. PATENT DOCUMENTS

| | | |
|---|---|---|
| 2,766,638 A | 10/1956 | Vice |
| 3,348,645 A | 10/1967 | Sigg |

(Continued)

FOREIGN PATENT DOCUMENTS

| | | |
|---|---|---|
| DE | 102012210287 A1 | 12/2013 |
| WO | 2012145580 A1 | 10/2012 |
| WO | 2014172274 A1 | 10/2014 |

OTHER PUBLICATIONS

"Eaton ELocker Differentials," JEGS Website, Available Online at http://www.jegs.com/p/Eaton/Eaton-ELocker-Differentials/1032956/10002/-1, Available as Early as Jun. 21, 2009, 3 pages.
(Continued)

*Primary Examiner* — David J Hlavka
(74) *Attorney, Agent, or Firm* — McCoy Russell LLP

(57) ABSTRACT

Methods and systems are provided for a motorized disconnect operable to selectively engage and disengage two rotating components of a vehicle drivetrain. As one example, a motorized disconnect system is provided that operates via an electric motor and includes a shifter assembly with an oscillating gear track and cam profile for rotating the shifter assembly while moving it in an axial direction to selectively couple two rotating components.

5 Claims, 27 Drawing Sheets

Related U.S. Application Data

(60) Provisional application No. 61/980,425, filed on Apr. 16, 2014, provisional application No. 62/051,864, filed on Sep. 17, 2014.

(51) Int. Cl.
*F16D 11/00* (2006.01)
*F16H 1/16* (2006.01)

(52) U.S. Cl.
CPC .... *F16D 2023/123* (2013.01); *F16D 2300/18* (2013.01); *F16H 1/16* (2013.01)

(56) References Cited

U.S. PATENT DOCUMENTS

| | | | |
|---|---|---|---|
| 3,753,479 A | 8/1973 | Williams | |
| 4,271,722 A | 6/1981 | Campbell | |
| 4,604,908 A | 8/1986 | Dolan | |
| 4,805,472 A * | 2/1989 | Aoki | B60K 23/08 180/247 |
| 4,811,824 A | 3/1989 | Kurihara | |
| 4,836,053 A | 6/1989 | Eastman et al. | |
| 4,862,755 A | 9/1989 | Eastman et al. | |
| 4,945,780 A | 8/1990 | Bosma | |
| 5,099,704 A | 3/1992 | Williams et al. | |
| 5,106,351 A | 4/1992 | Williams et al. | |
| 5,167,164 A * | 12/1992 | Maekawa | B60K 23/08 74/422 |
| 5,170,674 A | 12/1992 | Williams et al. | |
| 5,394,967 A | 3/1995 | Bigley | |
| 5,465,819 A | 11/1995 | Weilant et al. | |
| 5,520,272 A | 5/1996 | Ewer et al. | |
| 5,597,058 A | 1/1997 | Ewer | |
| 5,657,667 A * | 8/1997 | Noga | B60K 23/08 74/335 |
| 5,680,308 A | 10/1997 | Warren | |
| 5,699,870 A | 12/1997 | Warren | |
| 5,908,080 A | 6/1999 | Bigley et al. | |
| 5,996,719 A | 12/1999 | Galli | |
| 6,082,514 A | 7/2000 | Averill | |
| 6,082,515 A | 7/2000 | Oono et al. | |
| 6,109,411 A | 8/2000 | Bigley | |
| 6,422,369 B1 | 7/2002 | McCalla | |
| 7,000,750 B2 | 2/2006 | Ewer | |
| 7,793,767 B2 | 9/2010 | Heravi et al. | |
| 7,963,183 B2 | 6/2011 | Pick et al. | |
| 2001/0011622 A1 | 8/2001 | Arai et al. | |
| 2004/0055404 A1 | 3/2004 | Mills et al. | |
| 2005/0279601 A1 | 12/2005 | Tuday | |
| 2007/0095628 A1 | 5/2007 | Niederbacher | |
| 2009/0229392 A1* | 9/2009 | Kim, II | F16D 23/12 74/318 |
| 2009/0308710 A1 | 12/2009 | Lai et al. | |
| 2010/0089685 A1 | 4/2010 | Quehenberger et al. | |
| 2010/0107811 A1 | 5/2010 | McCloy | |
| 2010/0122884 A1 | 5/2010 | Mizon et al. | |
| 2010/0200352 A1 | 8/2010 | Williams | |
| 2012/0202636 A1 | 8/2012 | Perakes et al. | |
| 2013/0334000 A1 | 12/2013 | Gerauer et al. | |
| 2015/0308519 A1 | 10/2015 | Heravi et al. | |

OTHER PUBLICATIONS

"Air Lockers—ARB: 4×4 Accessories," ARB USA Website, Available Online at http://store.arbusa.com/Air-Lockers-C7.aspx, Available as Early as Aug. 8, 2009, 3 pages.
"Performance Differentials—Application Guide," Eaton Product Catalog, Mar. 2016, 20 pages.

* cited by examiner

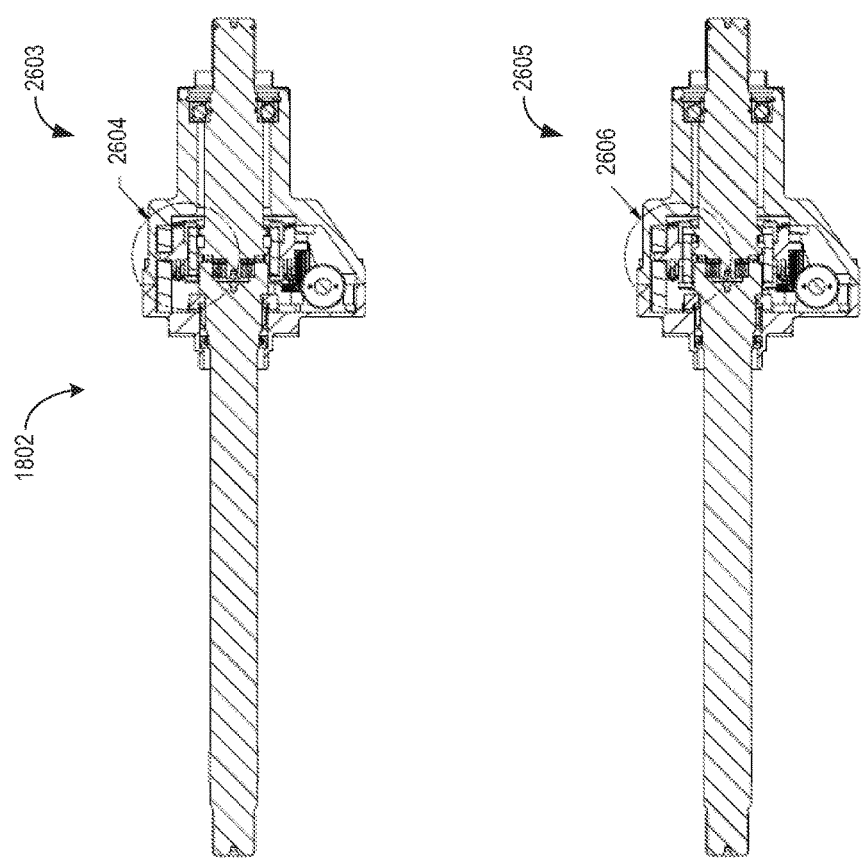

MOTORIZED DISCONNECT SYSTEM AND OPERATION METHODS

CROSS REFERENCE TO RELATED APPLICATIONS

The present application is a continuation application of U.S. patent application Ser. No. 14/678,245, filed Apr. 3, 2015. U.S. patent application Ser. No. 14/678,245 claims priority to U.S. Provisional Patent Application No. 61/980,425, entitled "Motorized Disconnect System and Operation Methods," filed on Apr. 16, 2014, and claims priority to U.S. Provisional Patent Application No. 62/051,864, entitled "Motorized Disconnect System and Operation Methods," filed on Sep. 17, 2014, the entire disclosure of each of which are hereby incorporated in their entirety by reference for all purposes.

FIELD

The present application relates generally to a motorized disconnect system for engaging and disengaging two rotating components of a vehicle.

SUMMARY/BACKGROUND

Modern vehicles often incorporate one or more drivetrain modes for providing power from an engine to the driven wheels. For example, a vehicle with only a two-wheel drive system, or 4×2 mode, may provide power via one or a series of rotating shafts to two wheels of the vehicle. Vehicles such as compact cars may use a front wheel drive system with power provided to the two front wheels. In other, often larger vehicles, it is often desirable to incorporate both two-wheel drive and four-wheel drive driving modes, wherein power may be selectively distributed to two wheels in one mode and four wheels in another mode. Vehicles of different sizes often incorporate two-wheel drive of the rear wheels and four-wheel drive for the purpose of enabling better handling during varying traction conditions while still being able to switch to two-wheel drive to reduce fuel consumption and reduce wasted power.

For vehicles with switchable drive modes, devices and systems are needed for engaging and disengaging drivetrain components such as axles and shafts. As such, disconnect assemblies are used that often involve a form of clutch that can move to connect or disconnect two rotatable components such as two shafts. The disconnect assemblies can be placed in a variety of areas in the drivetrain of a vehicle, including at the wheel ends, at one or more axles, or along one of the drive shafts. Through the use of disconnect systems, vehicles can be made more versatile by having the ability to switch between different drive modes depending on the driving conditions and operator desire.

In some powertrain disconnecting systems, vacuum directed from the vehicle engine is used as the motive or actuating force that powers the disconnecting systems. In particular, the disconnecting system actuators may be powered by the vacuum. In many systems, the vacuum is directed via a passage from the intake manifold of the gasoline-fueled engine. Due to this, the vacuum level, or amount of force or pressure available from the vacuum, may vary as engine throttle settings change along with engine load. For turbocharged diesel-fueled engine systems, vacuum may be generated by an auxiliary pump. For both gasoline and turbocharged diesel engine systems, the vacuum level (amount of pressure available) may be limited or vary due to the effects of altitude. Furthermore, temperature changes can also cause pressure fluctuations in the vacuum level, thereby causing fluctuations in movement of the disconnect actuator which may result in undesirable movement of disconnect components such as the diaphragm and clutch components. Additionally, in some vehicles vacuum may not be readily available since various vehicle accessory systems may not be powered by vacuum, or the vehicle may be designed to remove engine intake connections such as vacuum lines in order to enhance engine control and performance. Finally, vacuum-powered powertrain disconnect systems are becoming less desirable with more advanced vehicle design. As such, powertrain disconnect systems are needed that are powered by sources other than vacuum and feature designs conducive to modern vehicle systems. The inventors herein have recognized the above issues and developed various approaches to address them.

Thus in one example, the above issues associated with vacuum powered disconnects may be at least partially addressed by a motorized disconnect assembly, comprising: a shifter assembly including an undulating gear track undulating between two ends of the shifter assembly in a direction of a rotation axis of an interfacing, first shaft, the gear track trapped between fixed cam guides. In this way, a compact disconnect assembly is provided that is powered by an electric motor located on-board the disconnect assembly and does not rely on vacuum power. Also, the undulating gear track may allow the electric motor to be driven in only a single direction during one or more particular shift commands or modes, allowing the shifter assembly to move back and forth along an axial direction.

In another example, the motorized disconnect assembly may be placed in a self-contained housing and disposed between two rotating components. This may allow for a more compact design compared to other disconnect assemblies. Also, as described in further detail later, the placement of the disconnect housing may protect and substantially isolate internal components from external contamination such as dust and unwanted grease and/or oil. The isolation of inner components may aid in increasing the durability and longevity of the disconnect assembly, thereby reducing repair and replacement costs for its continued operation.

The proposed powertrain disconnect system may include an electric motorized disconnect that may alleviate the aforementioned issues associated with vacuum-powered disconnects. An electric motor-powered disconnect may not fluctuate as vacuum-powered disconnects do. Furthermore, the disconnect assembly also features a shifter assembly that rotates and moves axially via a worm drive. The axial movement may be caused by a worm gear engaging an oscillating (non-planar or curved) gear track that in turn moves the shifter assembly along the axial direction as the shifter assembly rotates. This movement may be used to cause engagement and disengagement between two rotating components, such a drive shafts and/or axles.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 23-27 show schematics of the center motorized disconnect for an axle of a vehicle.

FIGS. 2-5, 9-14, and 23-27 are drawn approximately to scale.

DETAILED DESCRIPTION

Figure 1:
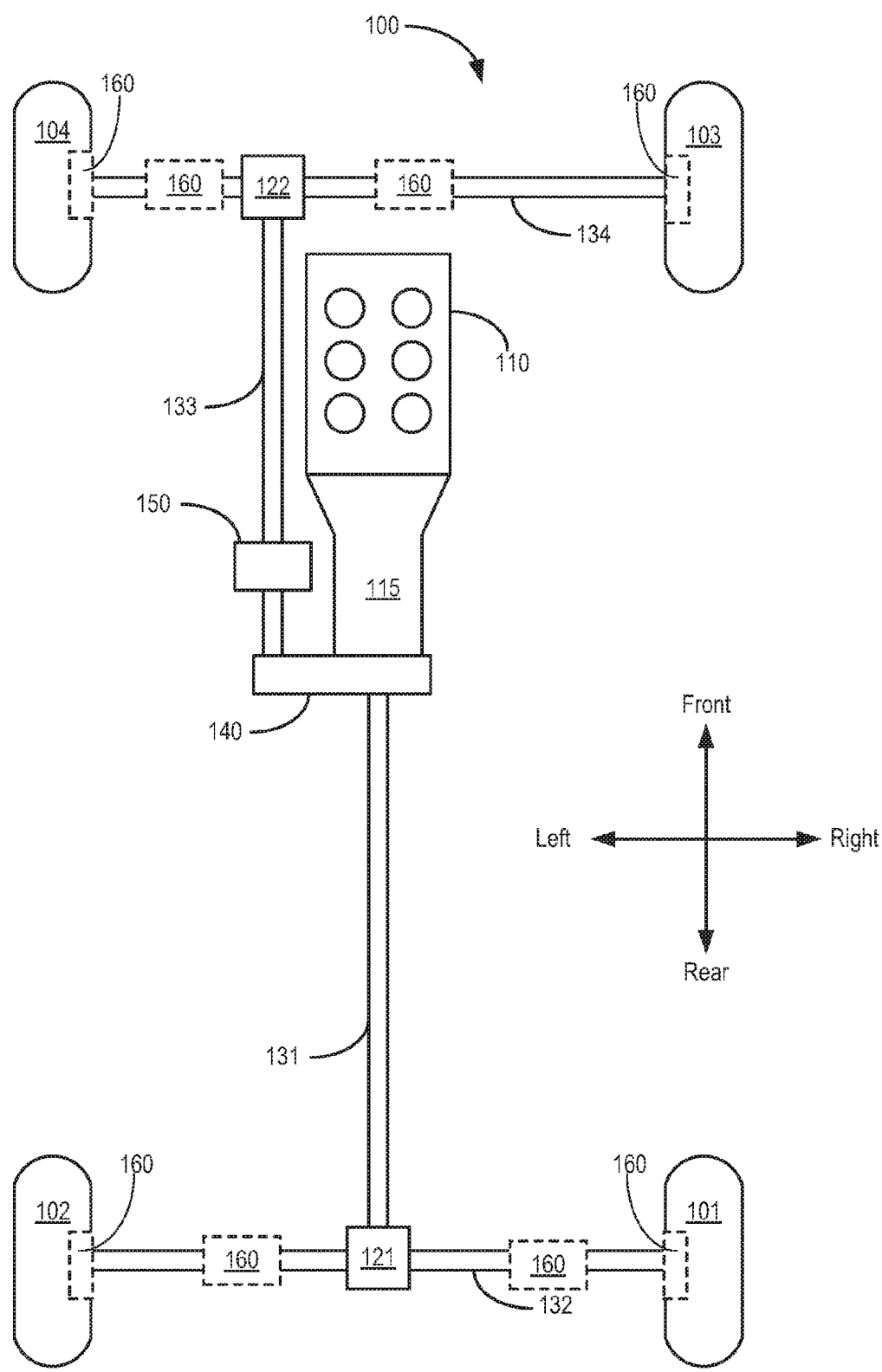
FIG. 1 shows a simplified powertrain of a vehicle in accordance with the present disclosure.
Figure 2:
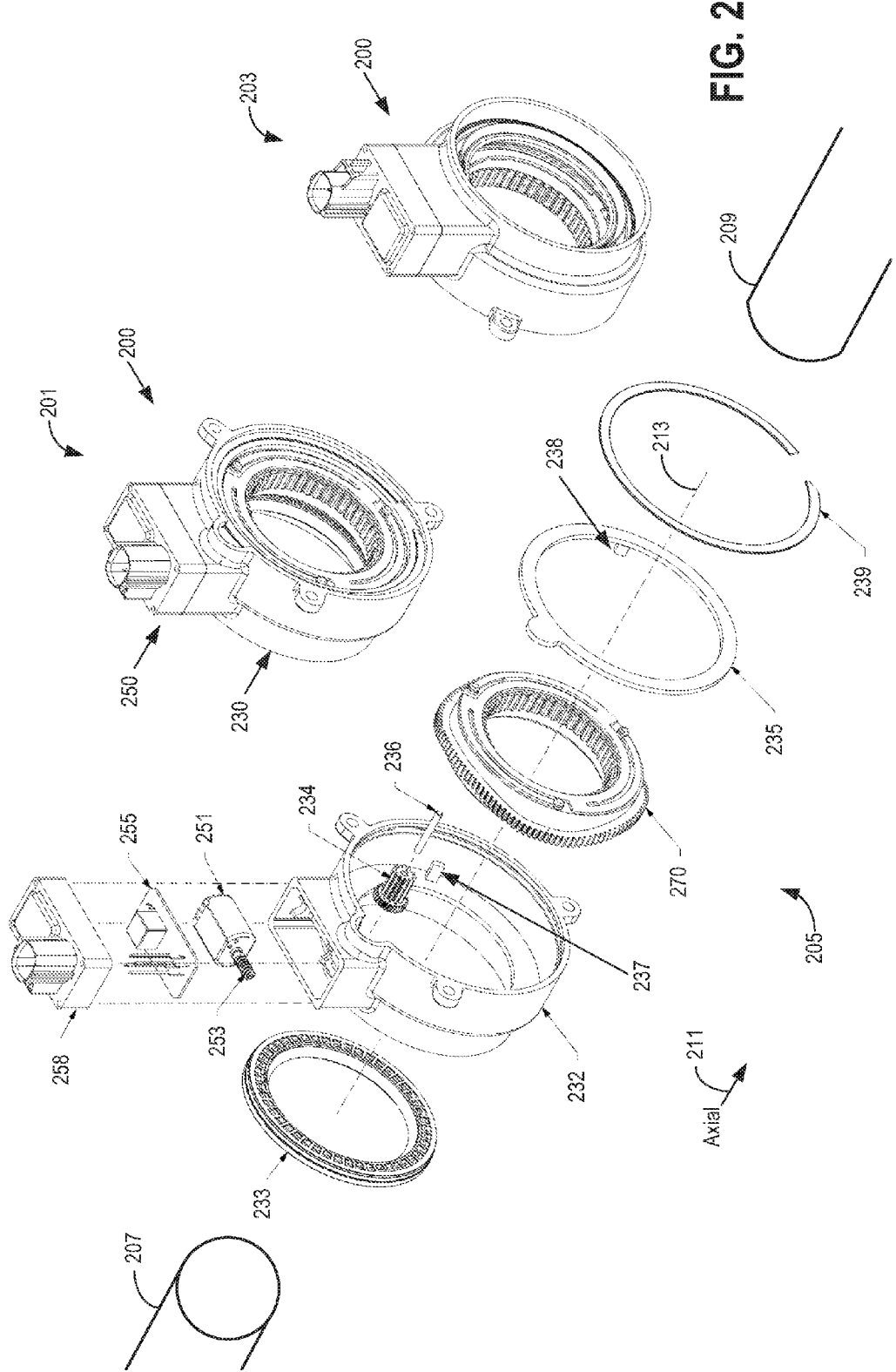
FIG. 2 shows a motorized disconnect for selectively engaging two rotating components of a vehicle drivetrain.
Figure 3:
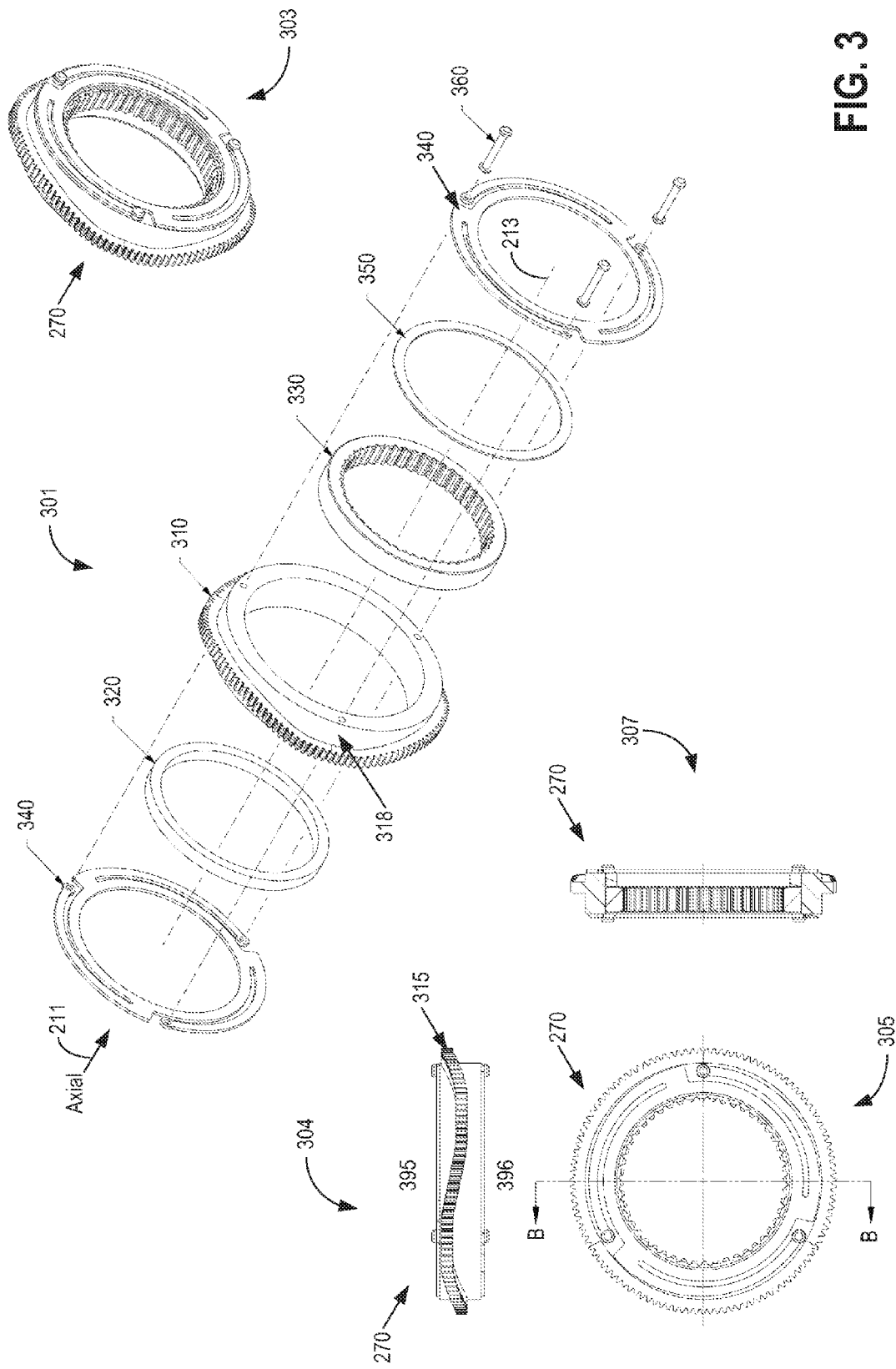
FIG. 3 shows a shifter assembly of the motorized disconnect of FIG. 2 in an exploded view.
Figure 4:
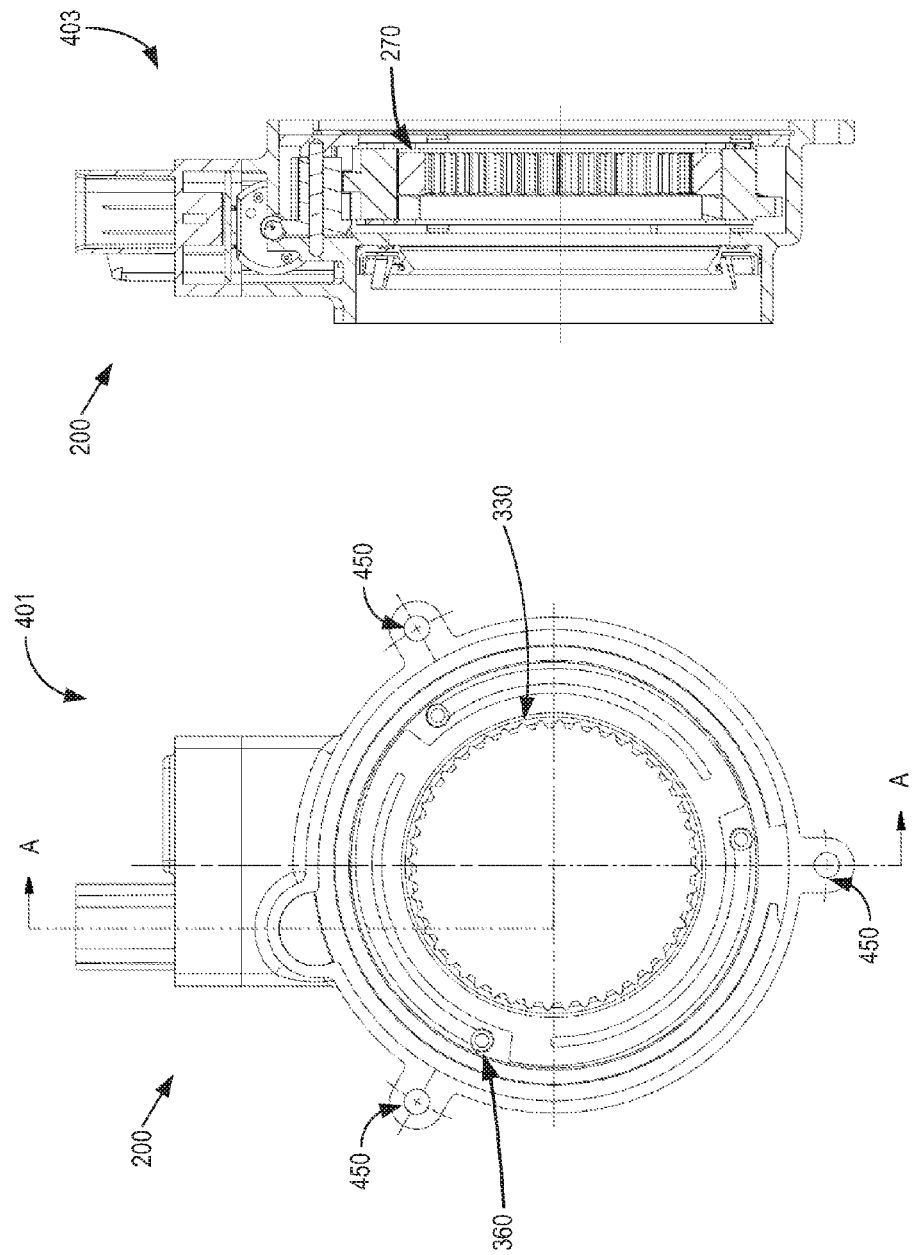
FIG. 4 shows a cross-sectional view of the motorized disconnect of FIG. 2
Figure 5:
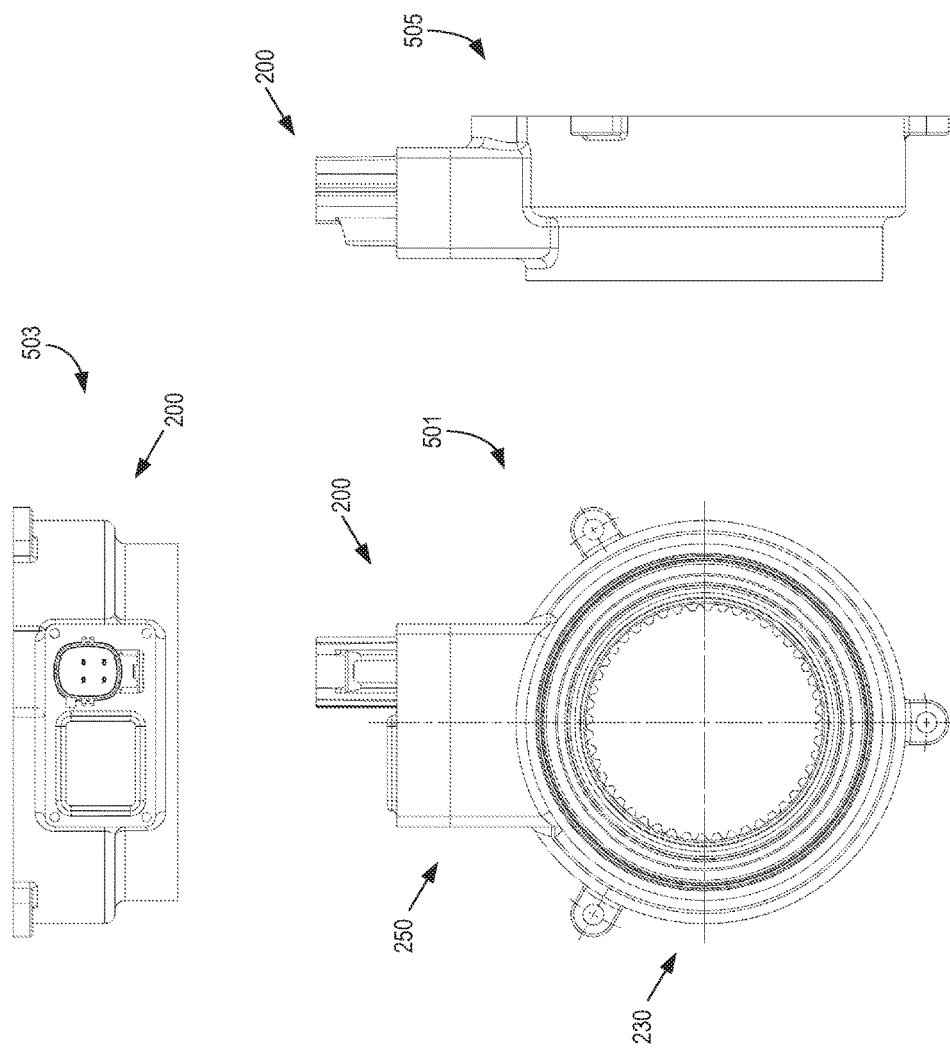
FIG. 5 shows additional views of the motorized disconnect of FIG. 2.
Figure 7:
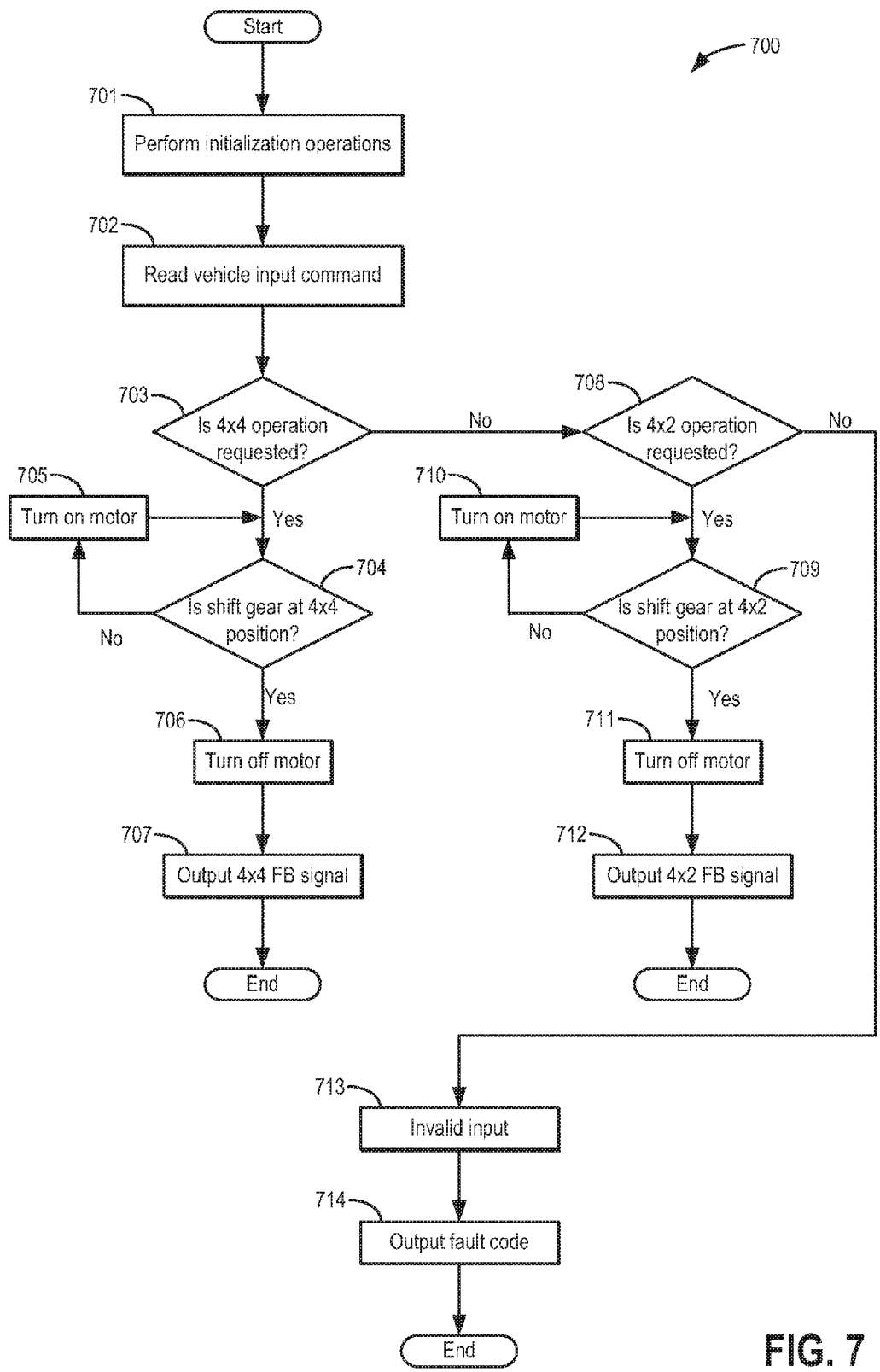
FIG. 7 shows a flow chart depicting general operation of shifting between 4×4 and 4×2 positions of the motorized disconnect.
Figure 8:
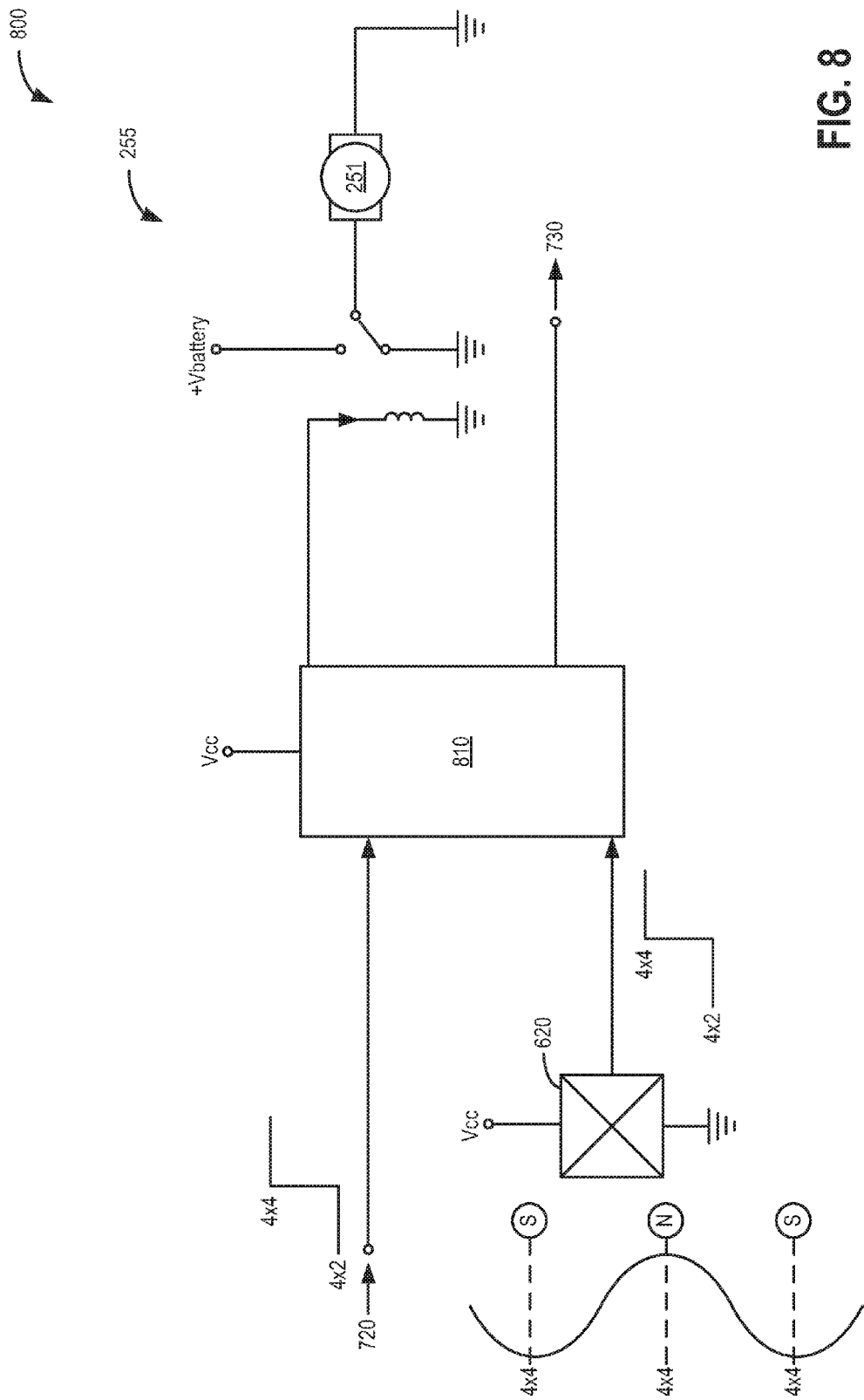
FIG. 8 shows a diagram of a controller for commanding shifting operations of the motorized disconnect of FIG. 2.
Figure 9:
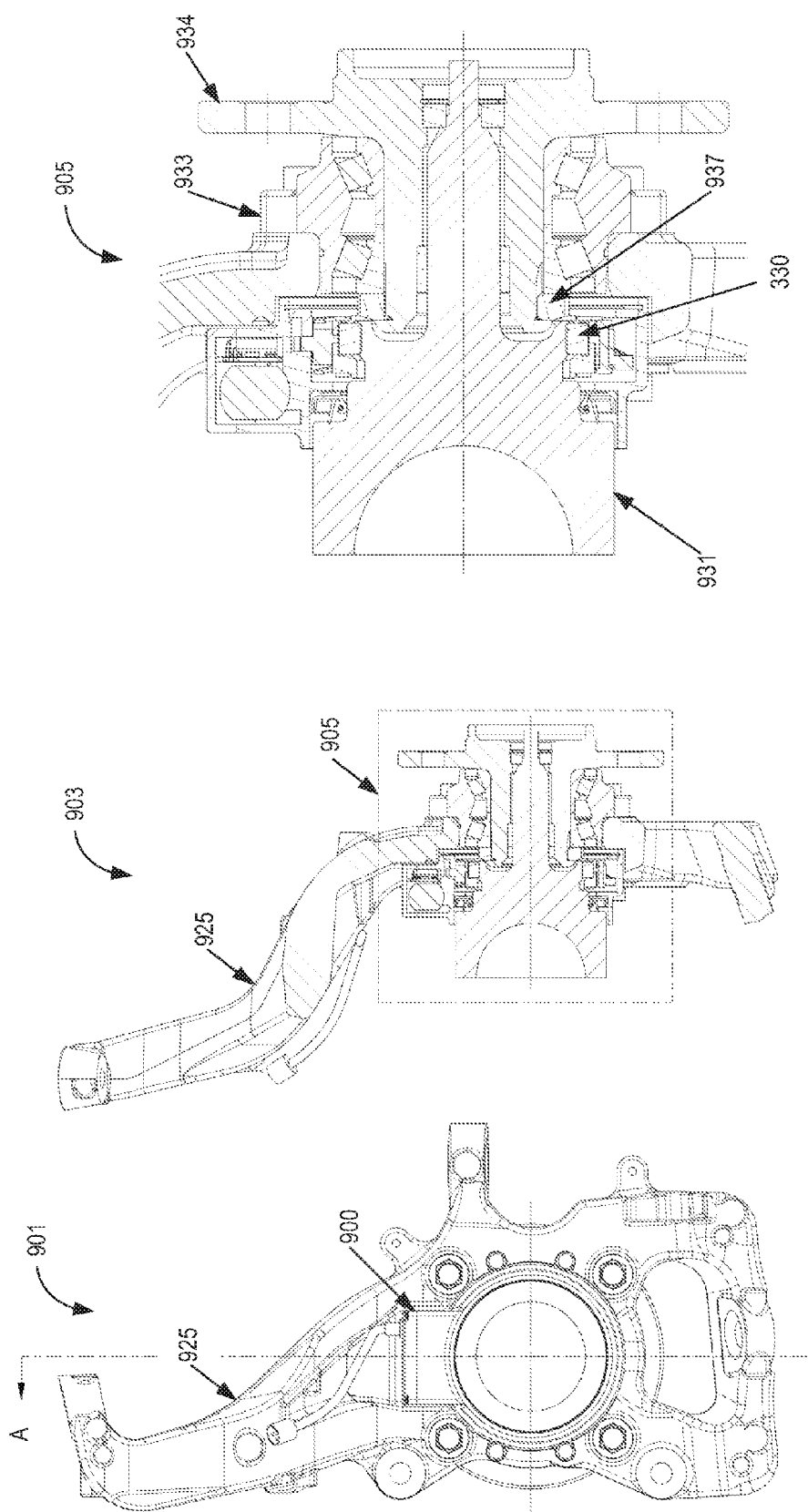
FIG. 9 shows another example of a motorized disconnect assembly attached to a wheel end.
Figure 15:
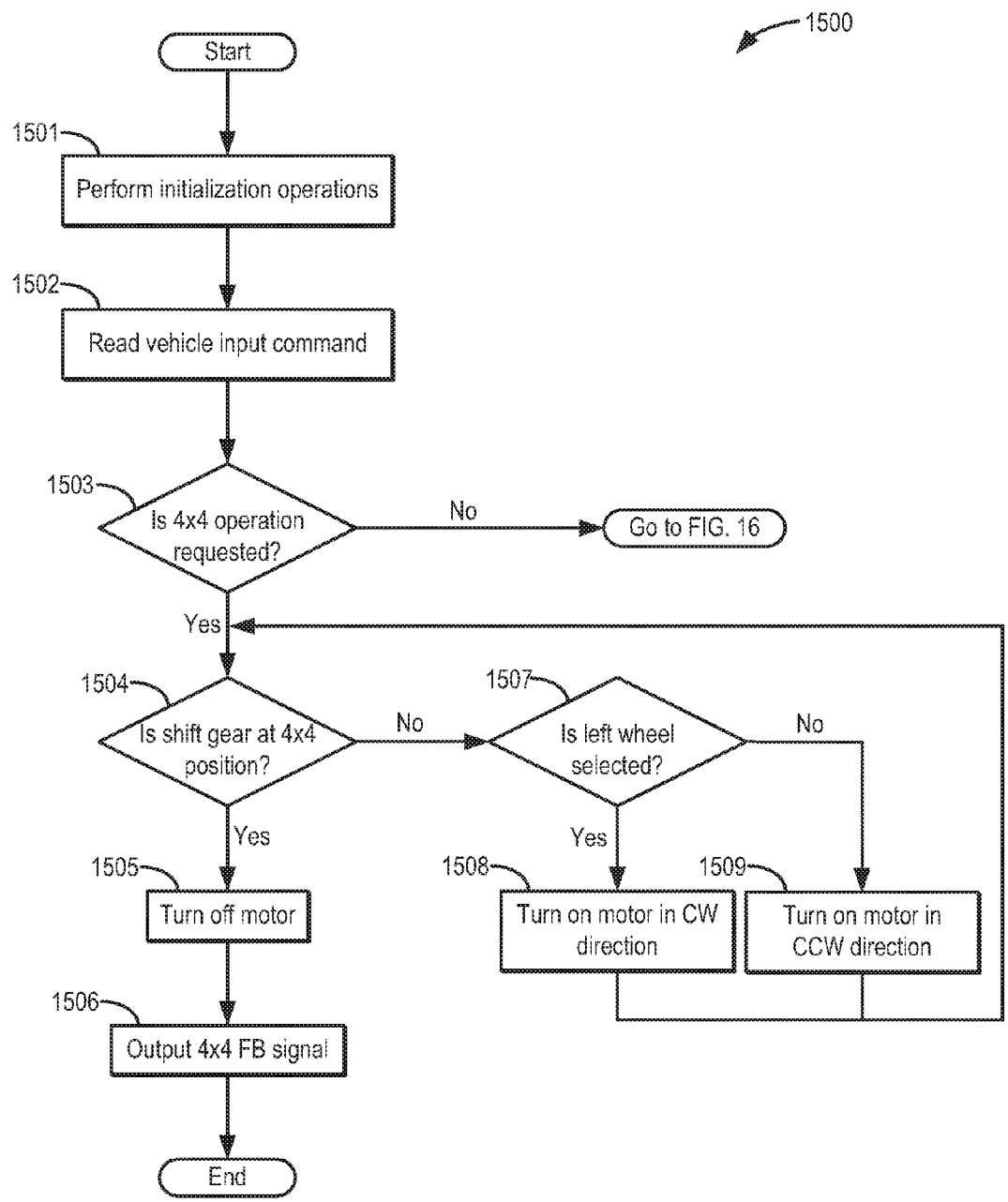
FIGS. 15 and 16 show a flow charts depicting general operation of shifting between 4×4 and 4×2 positions of the motorized disconnect located on the left or right side of the vehicle.
Figure 16:
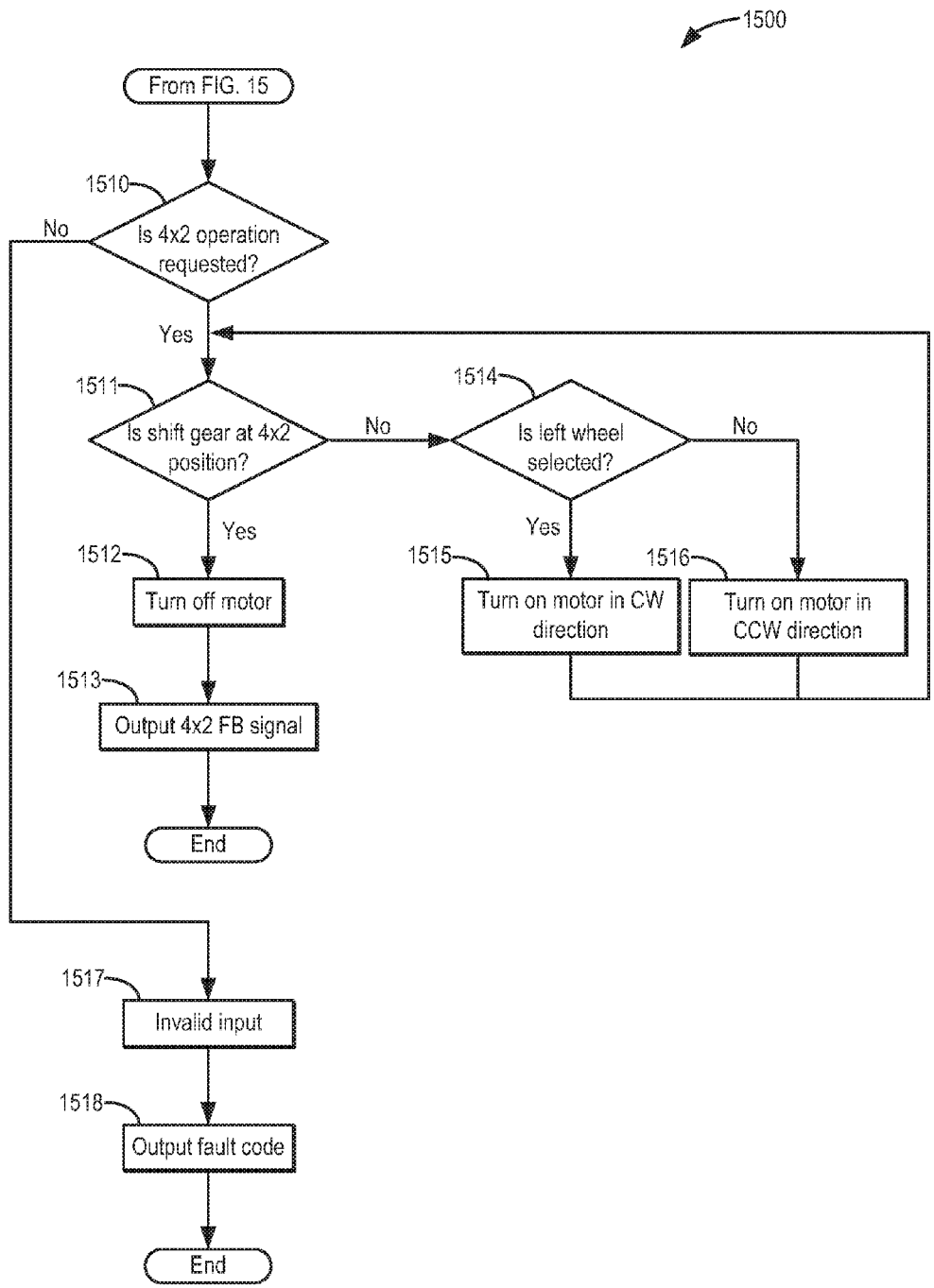
Figure 17:
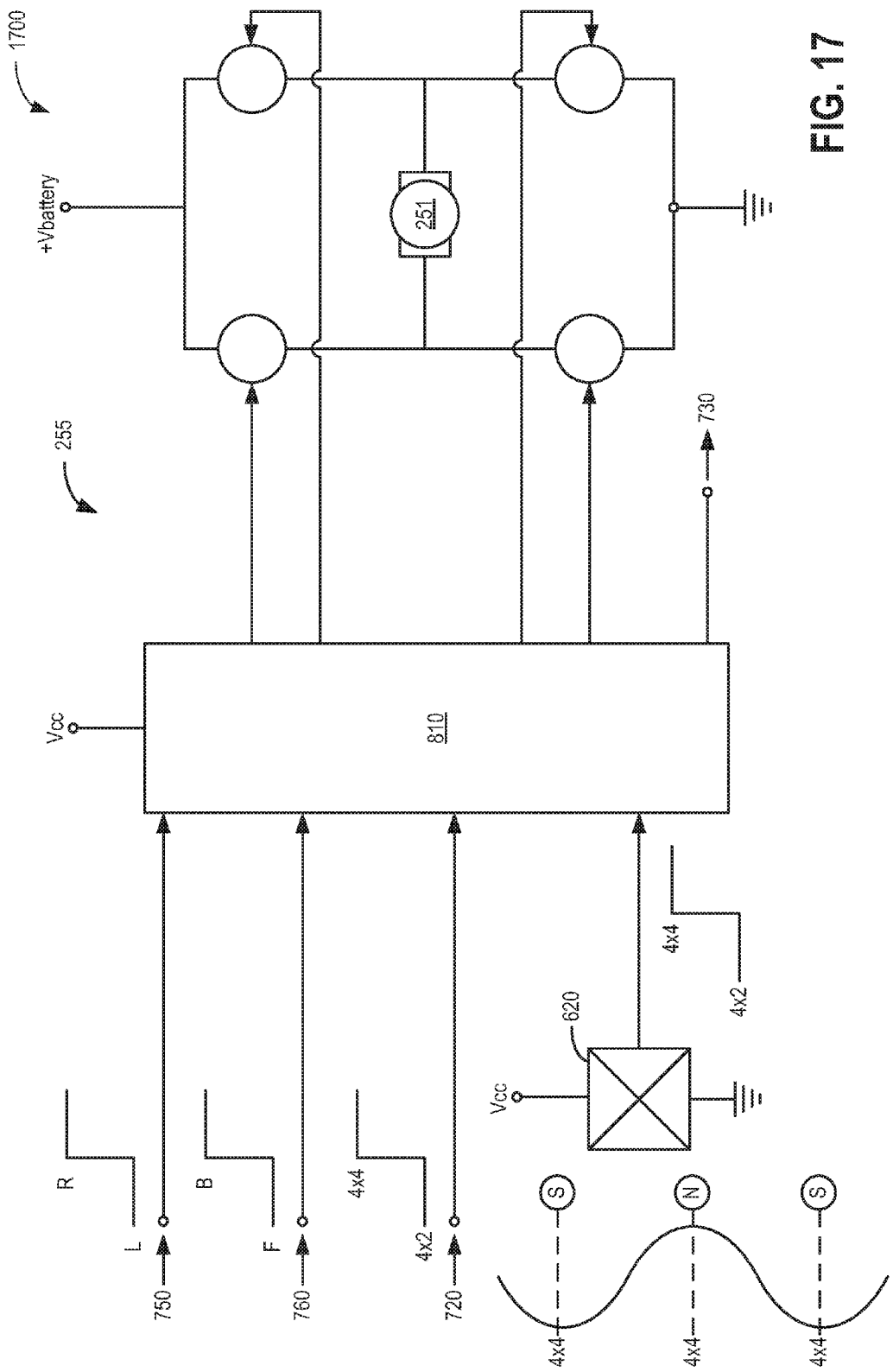
FIG. 17 shows a diagram of a controller for commanding shifting operations of the motorized disconnect of FIG. 9.

The following detailed description provides information regarding a motorized disconnect assembly and the methods of operation thereof for selectively connecting rotating components of a vehicle. An example embodiment of a vehicle powertrain is shown in FIG. 1, including an engine, a transmission, various axles and shafts, and wheels for providing motive power to the vehicle. One embodiment of a motorized disconnect operated by an electric motor is shown in FIG. 2 which may be used with the powertrain of FIG. 1. A component of the motorized disconnect of FIG. 2, a shifter assembly, is shown in FIG. 3. Additional views of the motorized disconnect are shown in FIGS. 4 and 5. A diagram showing a magnetic bi-polar sensor and associated system is displayed in FIG. 6 for detecting position of the shifter assembly. A method for operating the motorized disconnect is depicted in FIG. 7 while a simple schematic diagram of a controller located on the disconnect assembly is shown in FIG. 8. In one example, the motorized disconnect assembly may be a wheel end disconnect positioned at a wheel end of a vehicle. An embodiment of a motorized disconnect assembly utilized as a wheel end disconnect is shown in FIGS. 9-14 while a general operation scheme of the disconnect is shown in FIGS. 15 and 16. A simple schematic diagram for the controller of the disconnect of FIG. 9 is shown in FIG. 17. In another example, the motorized disconnect assembly may be a center motorized disconnect positioned on a front or rear wheel axle, as shown in FIGS. 18-22. An embodiment of a center motorized disconnect assembly is shown in FIGS. 23-27.

Regarding terminology used throughout this detailed description, vehicle operation where only two wheels receive power from the engine may be referred to as two-wheel drive, or 2 WD, or 4×2. The corresponding position of the motorized disconnect may be referred to as a 4×2 position. Alternatively, vehicle operation where all four wheels receive power from the engine may be referred to as four-wheel drive, or 4 WD, or 4×4. The corresponding position of the motorized disconnect may be referred to as a 4×4 position. Also, the motorized disconnect may selectively engage two rotating components. The system may also be applied in so-called all-wheel drive (AWD) applications. In some embodiments, these components may be axles, shafts, or other devices used in the drivetrain of the vehicle for transmitting rotational power.

Modern vehicles may be operated by a large variety of drivetrain systems that involve selectively powering different wheels according to different operating conditions and/or operator (i.e. driver) commands. For example, all-wheel drive vehicles may provide power to two collinear wheels during a first operating mode, and upon detection of slippage may also provide power to one or more of the remaining wheels. In other examples, a smaller vehicle, such as a passenger car, may permanently provide power to only the front two wheels of the vehicle in order to increase fuel economy (front two-wheel drive). Yet in other examples, a vehicle may be configured to selectively switch between a two-wheel drive and a four-wheel drive mode, wherein during the four-wheel drive mode all four wheels receive power. There are advantages and disadvantages to each vehicle drivetrain, and the particular utility and anticipated function of each vehicle may aid in determining which drivetrain to incorporate.

FIG. 1 shows a simple diagram of a powertrain 100 of a vehicle. In this diagram, the body of the vehicle along with many other components are removed for better viewing of powertrain 100. It is noted that the powertrain includes the components seen in FIG. 1 while a drivetrain may refer to the components of FIG. 1 excluding the engine and transmission, described further below. According to the powertrain configuration, the vehicle of FIG. 1 may be have a selective 4 WD drivetrain, wherein the rear wheels are powered in a rear-wheel drive mode (or 2 WD mode) and all four wheels are powered in a 4 WD mode, the 4 WD drive mode different than the 2 WD mode. Many utility vehicles such as larger trucks, all-terrain vehicles, and sports utility vehicles may incorporate rear-wheel drive rather than front-wheel drive for various reasons. One reason may be that rear-wheel drive is more conducive to load hauling or pulling, such as towing via a trailer connected to the rear of the vehicle.

In FIG. 1, a right rear wheel 101 and left rear wheel 102 are positioned at the rear of the vehicle, that is, the end located behind an operator of the vehicle. In this example, left, right, front, and rear orientations are given according to the perspective of the operator of the vehicle. Directional arrows for the front, rear, left, and right orientations are shown in FIG. 1. Accordingly, a right front wheel 103 and a left front wheel 104 are positioned at the front of the vehicle.

Power from the vehicle of FIG. 1 is generated by an internal combustion engine 110 having multiple cylinders.

Engine 110 can be a fueled by gasoline or diesel according to the specific vehicle, and in the present example engine 110 contains six cylinders configured in a V orientation, forming a V6 engine. It is understood that engine 110 may be configured in different orientations and contain a different number of cylinders while providing power in a similar fashion as seen in FIG. 1. A shaft powered by engine 110 may be directly coupled to a transmission 115 providing the necessary gearing for driving the vehicle. Transmission 115 may be a manual or automatic transmission according to the requirements of the vehicle system. A rear drive shaft 131 may be connected to transmission 115 as an output of the transmission, providing power to the rear end of the vehicle.

During the aforementioned 2 WD mode of powertrain 100, wheels 101 and 102 are powered via a rear axle 132. Rear axle 132 may be a single continuous shaft in some embodiments, or may be split into two axles in a bi-axle configuration, wherein the axle is interposed with a rear differential 121. In the bi-axle configuration, a first rear axle may be positioned between the rear differential 121 and the right rear wheel 101 and a second rear axle may be positioned between the rear differential 121 and the left rear wheel 102. The rear differential is also attached to rear drive shaft 131. The rear differential may serve several purposes, including allowing different relative rotational speeds between wheels 101 and 102 and transferring rotation (and power) from a single direction of drive shaft 131 into two perpendicular directions of rear axle 132, as seen in FIG. 1. For example, if the vehicle is turning in the left direction, then the inboard wheel (wheel 102) may rotate at a lower speed than the rotation of the outboard wheel (wheel 101). As such, rear differential 121 may allow the two wheels to rotate at different speeds in order to avoid slipping between the wheel of the vehicle and a road that the vehicle is traveling across during a turn.

For operation of the aforementioned 4 WD mode, wherein the front wheels are driven in addition to the nominally-powered rear wheels, a system is provided to transfer power to the front of the vehicle. A transfer case 140 may be positioned near the output of transmission 115, the transfer case 140 may be configured to direct a portion of power from engine 110 to a front drive shaft 133. In one embodiment, the transfer case 140 may utilize a chain to transfer a portion of power from rear drive shaft 131 to front drive shaft 133. In a similar fashion to the rear drive system, for the front drive shaft 133 connects to a front differential 122. The front differential 122 may be substantially the same as rear differential 121, in that the front differential 122 allows relative rotational speeds of two wheels. As such, a front axle 134, which may be divided into two axles of a bi-axle system, may be attached to differential 122 on one end and to their respective front left wheel 104 and front right wheel 103. In this configuration, drive power from front drive shaft 133 may be transferred through front differential 122 and to wheels 103 and 104 via front axle 134. Since transfer case 140 allows power to be outputted to both the front and rear axles, the 4 WD mode may allow all four wheels to be powered simultaneously. Said another way, when the vehicle is in the 4 WD mode, both the front wheels 103 and 104 and back wheels 101 and 102 may be driven.

For switching between 4 WD and 2 WD in the example of FIG. 1, a system is needed that selectively engages and disengages power input to the front wheels. As such, a disconnect 150 may be provided on front drive shaft 133, effectively dividing the shaft into two separate lengths. Disconnects may be used in vehicles with more than one drivetrain mode and enable engaging or disengaging two separate input components, such as wheel hubs, axles, and drive shafts. In the present example as seen in FIG. 1, disconnect 150 is positioned on front drive shaft 133. In other vehicle systems, disconnect 150 may be placed in a variety of locations, including on front axle 134. The disconnect 150 may be positioned on an output of a transmission, and/or positioned at a power transfer unit (PTU) to enable engagement and disengagement of the PTU shaft output. Furthermore, in some embodiments, multiple disconnects may be provided, each of the multiple disconnects fixed to a wheel hub of wheels 103 and 104. Depending on the particular location of the disconnect, various names are given, including wheel end disconnect and center axle disconnect. In the present example, disconnect 150 may selectively connect and disconnect two lengths of shaft 133 via a system of gears, control mechanisms, and other structure, as described later in more detail.

During the 2 WD mode when power is only provided to rear wheels 101 and 102, an input command may cause disconnect 150 to disengage fixed rotation between the two lengths of shaft 133, thereby providing no power to front axle 134 as well as wheels 103 and 104. As such, most power provided by engine 110 can be directed into rear drive shaft 131 with a relatively smaller amount of power diverted through transfer case 140 and into the length of shaft 133 connected to the disconnect. In other words, while disengaged, front wheels 103 and 104 may rotate freely without receiving tractive power from the engine. Also, the rotation of wheels 103 and 104 along with the rotation of axle 134 and the portion of shaft 133 disposed in front of disconnect 150 (as directed by the arrow in FIG. 1) does not affect the rotation of the rest of the drivetrain. Specifically, since disconnect 150 separates the two portions of shaft 133 located to the front and rear of the disconnect, rotation of the two lengths do not affect each other because they are separated (disengaged).

During the 4 WD mode when power is provided to all four wheels, an input command may cause disconnect 150 to engage fixed rotation between the two lengths of shaft 133, thereby providing power to all of shaft 133 as well as axle 134. In the current example, fixed rotation may be caused by engagement between a series of gears and/or splined shafts that allows the shafts on either end of disconnect 150 to rotate as a substantially single unit. During this operating mode, power from engine 110 power may be diverted substantially equally (or in other embodiments, non-equally) to wheels 101, 102, 103, and 104. It is noted that other drive modes are possible with the addition, change, and/or removal of components while still conforming to the scope of this disclosure.

Additionally, the powertrain 100 may include a motorized disconnect 160 positioned at one or more wheel ends to engage and disengage individual wheels with a corresponding axle (e.g., front axle 134 and/or rear axle 132). This type of disconnect may be referred to herein as a wheel end disconnect. The motorized disconnect 160 may alternately be positioned on one or both of the front axle 134 and the rear axle 132. Further, the motorized disconnect 160 may be positioned on either side of the front differential 122 and/or the rear differential 121. For example, in one embodiment, there may be a motorized disconnect 160 positioned on each side (e.g., both sides) of the front differential 122 on the front axle 134. Additionally, or alternatively, there may be a motorized disconnect 160 positioned on each side (e.g., both sides) of the rear differential 121 along the rear axle 132. In this way, the vehicle powertrain 100 may include a dual-disconnecting differential system. The type of disconnect positioned along the front or rear axles proximate to the front or rear differentials may be referred to herein as a center disconnect, as described further below with reference to FIGS. 18-27. The motorized disconnect described below may be used in one or more of the positions of the motorized disconnect 160 shown in FIG. 1.

As previously mentioned, some disconnects may be powered by vacuum diverted from the engine, such as engine 110 of FIG. 1. However, the inventors herein have recognized that vacuum may not be readily available or the vacuum power may undesirably fluctuate, thereby resulting in decreased disconnect control. Thus, alternate power sources may be utilized that provide simpler and more compact disconnect designs. As such, the inventors herein have proposed a motorized disconnect that is actuated by electric power from a motor located on the disconnect system. Electric power may be constantly maintained (without fluctuation) and may not require running vacuum lines throughout the vehicle, thereby increasing the reliability of electric power over vacuum power. First, a description of the various components of the proposed motorized disconnect will be given, followed by a description of the operation of the disconnect including an example control scheme.

FIG. 2 shows an exploded view 205, as well as a first assembly view 201 and second assembly view 203, of a motorized disconnect assembly 200 (referred to herein as disconnect 200). The first assembly view 201 and second assembly view 203 are oppositely facing views of the assembled disconnect 200. Disconnect 200 comprises a generally circular shape with a shifter structure 230 and a control assembly 250, the control assembly 250 attached to the outside of the shifter structure 230. For example, the control assembly 250 may be coupled to a single side (e.g., top side) of an outside surface of the shifter structure 230. In other embodiments, the control assembly 250 may be coupled at another position along the outside surface of the shifter structure 230 (such as the bottom side). The top side and bottom side of the shifter structure 230 may be defined with respect to a surface on which a vehicle in which the disconnect 200 is installed sits.

As seen in the exploded view 205 of disconnect 200, control assembly 250 includes an electric motor 251. The electric motor 251 turns an output shaft that is equipped with a worm 253 for use in a worm drive. It is noted here that motor 251 may only rotate in a single direction during a series of shifting modes without the ability to reverse directions. Thus, the driving direction of the motor 251 may not change during a period of time. This feature is explained in more detail later. Furthermore, control assembly 250 includes a controller 255 (e.g., hub controller) which may be configured to operate disconnect 200 while communicating with vehicle systems and controllers external to disconnect 200. It is noted that controller 255 is separate from a main vehicle controller or other similar devices of the vehicle. However, the controller 255 may communicate with and receive commands from a vehicle or engine controller. Either external or attached adjacent to controller 255, a magnetic bi-polar sensor may be positioned. As explained further below, magnets positioned around the circumference of shifter assembly 270 may rotate with the shifter assembly 270 to align with the bi-polar sensor such that the sensor can be triggered by one of the magnets within a sensing range. Finally, a cap 258 may enclose the controller 255 and motor 251 (with the worm 253) to form the shape of control assembly 250.

Shifter structure 230 comprises a generally circular and ring-like shape for the purpose of engaging (and disengaging) two generally circular input components, such as shafts or axles. As shown in FIG. 2, the disconnect 200 engages and disengages a rotatable, first shaft 207 and a rotatable, second shaft 209. In this example, the input components (e.g., first shaft 207 and second shaft 209) are input into disconnect 200 from both ends along the axial direction, as shown by the axial arrow 211 in FIG. 2. For example, a first input component (e.g., first shaft 207) may be positioned adjacent to a first end of the disconnect 200 and a second input component (e.g., second shaft 209) may be positioned adjacent to a second end of the disconnect 200, the first end opposite the second end with respect to the axial direction. A housing 232 is shown in FIG. 2 that provides an outer structure for protecting the internal components of disconnect 200. The housing 232 may aid in preventing dust and other contaminants from interfering with the function of the disconnect 200. A worm gear 234 is located inside housing 232 and is positioned to engage with worm 253 in order to provide rotation of worm gear 234 upon powering worm 253 via motor 251. The combination of worm 253 and worm gear 234 is also referred to as the worm drive. Rotation of the worm 253 (activated by motor 251) causes rotation of the worm gear 234. Particularly, worm gear 234 rotates about an axis parallel to the axial direction shown in FIG. 2 while worm 253 rotates about an axis perpendicular to the axial direction. In other words, the axes of rotation of worm 253 and worm gear 234 are perpendicular. Further, the axis of rotation of the worm gear 234 is parallel to a rotational axis 213 of the disconnect 200, where the rotation axis 213 is also a rotational axis of the first shaft 207 and second shaft 209.

A shifter assembly 270 is also located in housing 232 and provides the shifting motion that defines the operation of disconnect 200, that is, selectively connecting and disconnecting two rotating components (such as shafts). A pin 236 is located inside housing 232 and is positioned to couple the worm gear 234 to the housing 232. Also, a cam guide (e.g., may also be referred to herein as a fixed cam guide or a fixed guide) 237 is fixed inside the housing. Two additional fixed cam guides are positioned similarly to cam guide 237, along the inside of the housing (blocked from view in FIG. 2). The additional fixed cam guides are also fixed inside the housing so that none of the cam guides (including cam guide 237) move relative to movement of the shifter assembly 270). Cam guide 237 and the two additional fixed cam guides are stationary guides and may be part of the same material as housing 232. A sealed end of housing 232 is at least partially covered by a seal 233. A shaft or axle, such as first shaft 207, can be inserted through the center of seal 233, where the seal 233 may be sized to provide a tight connection between the seal and shaft. The tight connection may substantially prevent debris from entering the inside of housing 232 while still allowing the shaft to rotate and the seal 233 to remain stationary and attached to the housing 232. The sealed end of housing 232 that includes seal 233 may enclose the first shaft 207 (first input component). A cam keeper 235 is located adjacent to an axial-facing surface of the shifter assembly 270, where the cam keeper includes a holding tab that can be inserted into a groove formed in the housing such that the keeper is held stationary relative to housing 232 (without rotating). Shifter assembly 270 may be generally circular in shape with a central axis that is parallel to the axial direction and collinear with the central axes of other components, such as seal 233, cam keeper 235, and housing 232. Furthermore, cam keeper 235 includes three fixed guides (e.g., fixed cam guides) 238 that are stationary and positioned to protrude from the cam keeper towards shifter assembly 270. Only one cam guide 238 is visible in FIG. 2.

Finally, a retaining ring 239 (e.g., lock ring) may be positioned outside the cam keeper 235 to hold the other components inside housing 232 and reduce undesired movement during vehicle operation. The end of housing 232 opposite to the sealed end containing seal 233 is located in the more positive axial direction and includes cam keeper 235 and retaining ring 239, as seen in the exploded view 205 of FIG. 2. The opposite end of housing 232 may enclose the second shaft 209 (second input component).

FIG. 3 shows an exploded view 301, an assembly view 303, a top view 304, a side view 305, and a sectional view 307 (sectional view 307 is taken along section B-B, as shown in side view 305) of shifter assembly 270 of FIG. 2. The shifter assembly includes a shifter gear 310 that forms the outside shape (e.g., outer portion) of the shifter assembly 270. The outer surface of shifter gear 310 is covered by a non-planar gear track 315 that oscillates between the two ends of the shifter gear 310, the two ends being first end 395 and second end 396. The two ends 395 and 396 are located axially on either end of shifter gear 310, as shown in top view 304. The gear track 315 circumscribes the outer surface of shifter gear 310 without following the linear profile of the two ends. Said another way, the gear track 315 is continuous around an outer circumference of the shifter gear 310, the gear track 315 having a substantially sinusoidal path as it travels around the outer circumference of the shifter gear 310. Additionally, the gear track 315 may pass both above a below a vertical centerline of the shifter gear 310, the vertical centerline perpendicular to the axial direction (e.g., perpendicular to the axis of rotation of the shifter gear 310, where the axis of rotation of the shifter gear 310 is the rotational axis 213 of the disconnect 200).

Shifter assembly 270 also includes a clutch ring 330 that is positioned on the inner surface of shifter gear 310. The clutch ring 330 includes gear teeth that may mesh with the gear teeth of an external shaft or axle. The clutch ring 330 includes an inner surface and an outer surface, the inner surface including the gear teeth of the clutch ring 330. An outer diameter of the clutch ring 330 may be smaller than an inner diameter of the shifter gear 310 such that the clutch ring 330 fits within the shifter gear 310. Also, the clutch ring 330, while located inside shifter gear 310, is free to rotate at a different rate than shifter gear 310 and can rotate while the shifter gear 310 is stationary. However, clutch ring 330 is constrained to move axially with the shifter gear (and shifter assembly 270). A first washer 320 is located on one side of shifter gear 310 while a second washer 350 is located on the opposite side of shifter gear 310, adjacent to clutch ring 330. Lastly, two springs 340 are included in the shifter assembly, with one spring located on either end of the shifter assembly, as seen in FIG. 3. As one example, the two springs 340 may be finger springs. For example, as shown in FIG. 3, each spring 340 contains three flexible arms that bend to provide the flexible, reversible force of the springs. However, a different type of spring other than a finger spring may be used for springs 340. Springs 340, along with washers 320 and 350, may constrain clutch ring 330 to move axially with the shifter assembly 270. As shown in FIG. 3, only a single washer (e.g., washer 320 or washer 350) is positioned between the shifter assembly 270 and one of the springs 340. A number of rivets 360 may be inserted through the components of the shifter assembly in order to hold the shifter assembly together as a single unit.

The oscillations (e.g., undulations) of gear track 315 complete multiple cycles around the periphery of shifter gear 310. A complete cycle is defined as the length of gear track 315 that oscillates from a point adjacent to first end 395, away towards a point adjacent to second end 396, and finishes at another point adjacent to first end 395. The orientation of shifter assembly 270 with gear track 315 shows one complete cycle of the gear track. The oscillations of gear track 315 may be continuously curved (sinusoidal) in some embodiments, while in other embodiments the gear track 315 may include inclined, generally linear ramps joined by flat, linear sections. Other gear track shapes may be possible that complete multiple cycles around the periphery of shifter gear 310. Gear track 315 may be in contact with worm gear 234 of FIG. 2 such that power from worm gear 234 provided by motor 251 is transmitted into gear track 315 to cause rotation of shifter assembly 270. More specifically, teeth of the worm gear 234 may mate and interlock with teeth of the gear track 315. As such, rotation of the worm gear 234 causes rotation of the gear track 315 and subsequently the shifter assembly 270. In addition to providing rotation, shifter assembly 270 may move linearly in the axial direction as shown by the axial arrow 211 in FIG. 3. Specifically, shifter assembly 270 may move back and forth along the axial direction relative to the stationary housing 232 with the attached control assembly 250. Housing 232 may be fixed to an external stationary vehicle component, as outlined below with regard to FIG. 4.

Rotational and axial movement of shifter assembly 270 is actuated by worm gear 234 engaging with gear track 315. As seen in FIG. 3, gear track 315 protrudes radially away from shifter gear 310, forming a cam profile 318 which may be defined as the surfaces on either side of the gear teeth of gear track 315. More specifically, the gear track 315 extends outwardly away from the outer surface of the shifter gear 310 (in a direction perpendicular to the rotational axis of the shifter assembly 270). Fixed cam guides 237 contact cam profile 318 on one side of shifter gear 310 and fixed cam guides 238 contact the cam profile on the opposite side of shifter gear 310. In this way, gear track 315 is effectively trapped (e.g., disposed) between the fixed cam guides (e.g., fixed guides) 237 and 238. Therefore, as shifter assembly 270 rotates, fixed cam guides 237 and 238 slide against cam profile 318, thereby causing the shifter assembly to move axially.

In one example, axial cam profile 318 may be divided into three equal portions, where each portion includes a 4×4 and a 4×2 position along with cam ramps in between the positions. In particular, the three equal portions form three complete cycles of gear track 315, wherein the 4×4 and 4×2 positions are the points closest to first end 395 and second end 396 of shifter gear 310, respectively. Correspondingly, in this example, gear track 315 also contains three equal portions identical to the three equal portions of axial cam profile 318. Therefore, as motor 251 operates worm 253 and worm gear 234 in a single or first direction, gear meshing between worm gear 234 and gear track 315 may cause rotation and axial movement of shifter assembly 270. In this way, motor 251 may be driven in the single direction during shifts to 4×2 and 4×4 modes. The spinning direction of motor 251 may be reversed to a second direction when vehicle direction changes such that the first rotating component also changes direction. It may be desirable to rotate shifter assembly 270 in the same direction as the rotation of the powered, first rotating component. As such, when vehicle moving direction changes, motor 251 may also change direction. In this way, the single or first spinning direction of motor 251 may be maintained as long as the vehicle is moving in a corresponding direction. In a similar fashion, as explained in further detail later, the spinning direction of motor 251 may depend on if disconnect assembly 200 is placed on the left or right side of the vehicle, such as near wheels 103 or 104.

Springs 340 shown in FIG. 3 are attached to either side of shifter gear 310 and aid in holding clutch ring 330 within the shifter assembly. For example, during a shift to the 4×4 position, if the teeth of clutch ring 330 are not aligned with the mating teeth of an external rotating component (e.g., a shaft or an axle), then the springs will deflect to allow clutch ring 330 to remain axially stationary while the rest of shifter assembly 270 moves in the axial direction toward the external rotating component. As clutch ring 330 continues to rotate and aligns with the mating teeth of the external component, then springs 340 may force the clutch ring into the desired position within shifter gear 310. During this example, axial movement of the clutch ring 330 occurs after axial movement of the shifter assembly 270 upon alignment of the teeth of the clutch ring and second shaft.

When a shift from 4×4 to 4×2 or vice versa is commanded by an external controller, a signal may be sent to controller 255, which then commands motor 251 to actuate the worm drive. In particular, controller 255 may contain computer-readable instructions stored in non-transitory memory for adjusting the shifter assembly based on the request from the control system external to the motorized disconnect assembly. As shifter gear 310 begins to rotate (via the worm drive) and moves axially as cam profile 318 is pushed by fixed cam guides 237 or 238, clutch ring 330 may resist the axial movement due to friction in the clutch teeth. A shifting force will act on clutch ring 330 as the rest of shifter assembly 270 attempts to move axially. As the clutch ring rotates, since it is connected to an external rotating component such as an axle, a torque may be generated by the clutch ring and transmitted into the rest of shifter assembly 270. This torque may cause shifter assembly 270 to rotate, thereby adding to the torque provided by motor 251 and increasing shift speed as shifter assembly 270 rotates and moves axially to its other position.

For general operation of the motorized disconnect seen in FIGS. 2 and 3, and in particular operation of shifter assembly 270, the vehicle is initially in a first drive mode. In this case, the first drive mode is 2 WD or 4×2 which corresponds to the disconnect being in a disconnected position wherein the two input components are not connected via disconnect 200. A second drive mode may be 4 WD or 4×4, which corresponds to the disconnect being in a connected position wherein the two input components are engaged via disconnect 200 and rotation of one of the components corresponds to rotation of the other component. Specifically, when clutch ring 330 is connected to only one of the input components, the vehicle is in the 4×2 mode. Alternatively, when the clutch ring is connected to both the input components, such as two shafts, the vehicle is in the 4×4 mode. In this way, as shifter assembly 270 moves axially by an amount determined by the motor and worm drive, clutch ring 330 also moves axially either engaging or disengaging the two rotating components. Upon detection that the shifter assembly 270 is in the requested 4×4 or 4×2 mode, controller 255 may turn off the motor.

In one example operation scheme for selectively engaging two rotating components (shafts), the vehicle may initially be in the first mode (2 WD). During this mode, shifter assembly 270 may be held in a first position. The first position may locate the shifter assembly in a position closer to seal 233, or in the negative axial direction as shown by the arrow 211 in FIG. 3. In this first position, a first shaft 207 may be engaged with the shifter assembly, in particular with clutch ring 330 while a second shaft 209 is not coupled to clutch ring 330. Then, a command may be issued by a vehicle controller to shift from the first mode (2 WD) and to the second mode (4 WD). During shifting to the second mode, worm gear 234 may be driven by worm 253 powered by motor 251 to drive gear track 315. As seen in FIG. 3, the gear track 315 oscillates between the first and second ends (sides) 395 and 396, which causes the shifter assembly to slide against fixed cam guides 237 and 238, thereby moving the shifter assembly in a first axial direction (as shown by the arrow 211 in FIG. 2) to a second position where shifter assembly 270 is engaged with both the first shaft and the second shaft. Said another way, the teeth of the clutch ring 330 may be engaged with corresponding teeth of both the first shaft 207 and the second shaft 209. The second position may be located in a more positive axial direction (defined by the axial direction arrow in FIG. 2) than the first position, such that shifter assembly 270 is farther away from seal 233 in the second position than in the first position. Subsequently, a command may be issued by the vehicle controller to shift back to the first mode (2 WD). As such, the motor may continue driving the worm gear in the same direction, thereby moving the shifter assembly in a second axial direction (the negative axial direction of FIG. 2, opposite of the arrow) until the shifter assembly reaches the first position in which the second shaft is again disengaged from the clutch ring 330.

In some embodiments, an additional, multi-plate clutch may be coupled in series with the shifter assembly 270 including the clutch ring 330. As one example, the multi-plate clutch (which may also be referred to as a friction clutch) may include a set of wedge plates rotationally coupled to one of the first and second shafts 207 and 209 and a set of clutch plates rotationally coupled to the other one of the first and second shafts 207 and 209. A pressure plate (e.g., piston plate) may compress the wedge and friction plates to synchronize the speeds between the first and second shafts 207 and 209. The clutch ring 330 of the shifter assembly 270 may then be used as a locking clutch to lock the first and second shafts 207 and 209 to one another, thereby fully engaging the two shafts for complete torque transfer between the two shafts. It should be noted that the multi-plate clutch described above may be included in series with any one of the motorized disconnect assemblies described herein.

FIG. 4 shows a front view 401 and cross-sectional view 403, taken along section A-A of front view 401, of the motorized disconnect 200. From the front and cross-sectional views, shifter assembly 270 is visible along with the teeth of clutch ring 330. Furthermore, disconnect 200 may include one or more mounting brackets 450, each containing a hole for inserting screws, bolts, or other suitable fasteners. With mounting brackets 450, the motorized disconnect can be mounted to a variety of stationary vehicle components to securely hold the disconnect in place. For example, if disconnect 200 were placed at the wheel ends of a vehicle, such as near wheel 103 of FIG. 1, then brackets 450 may be secured to the knuckle of the wheel, or other non-rotating component that holds the wheel in place. In alternate embodiments, the disconnect 200 may not include brackets 450 and/or may include an altered housing for mounting the disconnect to an alternate vehicle location, such as along a front or rear axle, as described further below.

FIG. 5 shows a front view 501, top view 503, and side view 505 of motorized disconnect 200. As seen in FIG. 5, control assembly 250 may be integrally formed with housing 232 of shifter structure 230 such that housing 232 extends as a single piece to contain the components of control assembly 250. In other embodiments, control assembly 250 may be removably fixed to shifter structure 230 via removable fasteners such that the control assembly can be easily unattached from the rest of the disconnect. In this way, replacement of parts of control assembly 250 can be easily replaced without disassembling the entire disconnect. Replaceable parts may include motor 251, worm 253, and controller 255.

As mentioned previously, disconnect 200 includes an on-board controller 255 that may be configured to drive motor 251, among other functions. Furthermore, a magnetic bi-polar sensor may be located inside control assembly 250 or adjacent to assembly 250 inside shifter structure 230. The bi-polar sensor may be coupled to (and/or incorporated as part of) controller 255 and configured to send and receive signals with the controller. The purpose of the bi-polar sensor may be to determine the position of shifter assembly 270, that is, whether or not the shifter assembly is in the 4×4 (2 WD) or 4×4 (4 WD) position. Magnets may be placed around the periphery of shifter assembly 270 with alternating polarities such that bi-polar assembly can differentiate between the different magnets in order to determine shift position. For example, a north magnetic polarity may correspond to 4×2 positions whereas a south magnetic polarity may correspond to 4×4 positions.

Figure 6:
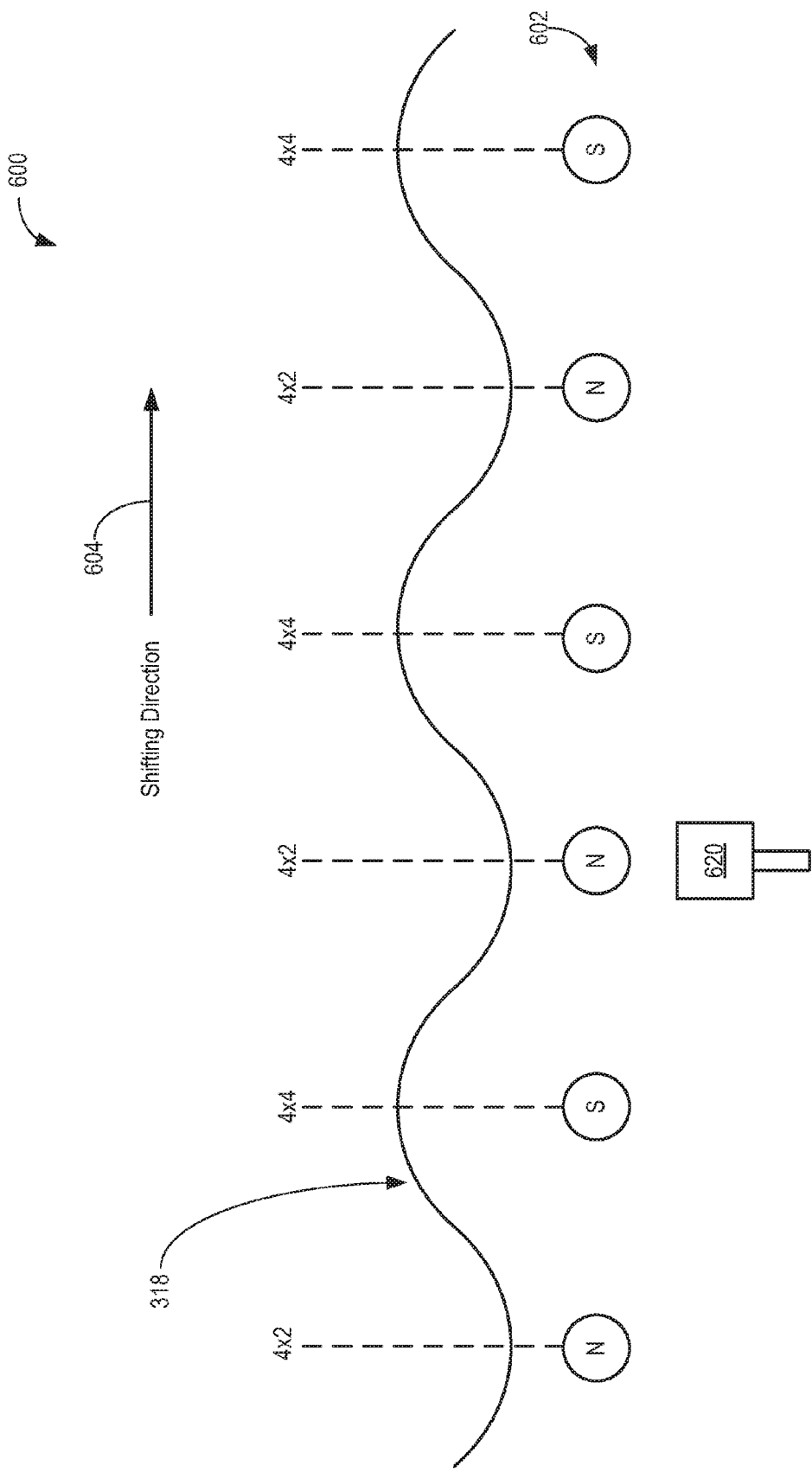
FIG. 6 shows a diagram of a magnetic bi-polar sensor and polarized magnets for detecting the position of the motorized disconnect.

FIG. 6 shows a simplified diagram 600 of the operation of a bi-polar sensor 620 for determining the shift position of shifter assembly 270. An oscillating cam profile 318 is displayed in FIG. 6, the same cam profile as previously described above with reference to FIG. 3. To reiterate, cam profile 318 is formed by gear track 315 shifting between the two end faces of shifter gear 310. While bi-polar sensor 620 may be positioned in a stationary manner in control assembly 250, six magnets 602 may be placed in shifter gear 310 near cam profile 318 and gear track 315. For example, the six magnets 602 may be placed directly on cam profile 318 at the intersection where gear track 315 protrudes from shifter gear 310 around the circumference of shifter gear 310. In this case, six magnets 602 are used since cam profile 318 (and gear track 315) completes three full cycles around the periphery of shifter gear 310. Furthermore, in this example, magnets with a north (N) polarity may align with the 4×2 positions of cam profile 318 while magnets with a south (S) polarity may align with the 4×4 positions of cam profile 318. Bi-polar sensor 620 may be placed near shifter gear 310 in order to detect the six magnets 602. Since the magnetic field produced by each of the magnets can be detected by bi-polar sensor 620 from a distance, a space may be maintained between the sensor and the magnets, thereby reducing wear of the sensor and magnets. It is noted that the number of magnets may be even to allow for an equal number of 4×2 and 4×4 positions on cam profile 318.

As shifter gear 310 (and shifter assembly 270) rotates, the magnets alternatingly pass in front of bi-polar sensor 620 in the shifting direction shown in FIG. 6 at 604. Only one shifting direction is shown in FIG. 6 since motor 251 may spin in a single direction during a shifting operation, as previously explained. In the position shown in FIG. 6, the north magnet may be sensed by sensor 620 and a signal sent to controller 255, signifying that the shifter assembly is currently in a 4×2 position. Next, as a shifting action occurs and cam profile 318 moves, once the subsequent magnet with a south polarity passes in front of sensor 620, a signal may be sent to controller 255. Upon receiving the signal, the controller may issue a command to motor 251 to stop rotation of shifter assembly 270, thereby holding the assembly in the detected 4×4 position corresponding to the southern-polarity magnet. In this way, the controller 255 may activate and deactivate the motor 251 based on the position of the shifter assembly 270 as determined by a pole of the magnet proximate to (e.g., closest to) the bi-polar sensor 620.

FIG. 7 shows a flow chart for operation of the motorized disconnect according to one embodiment of the present disclosure. To reiterate, the 4×2 (2 WD) mode corresponds to the position where shifter assembly 270 engages only one of two shafts while the 4×4 (4 WD) mode corresponds to the position where shifter assembly 270 engages both of the shafts, thereby coupling the two shafts together. For ease of understanding, reference will be made to components and description presented with regards to the previous figures. FIG. 7 displays a method 700 for controlling movement and shifting functions of the disconnect, such as disconnect 200 and associated components of FIGS. 2-5. Instructions for carrying out method 700 may be stored in a memory of a controller, such as controller 255 shown in FIG. 2.

First, at 701, a series of initialization operations may be performed by controller 255. The initialization operations may include calibration of the bi-polar sensor attached to the controller along with establishing communication between the controller and an external controller, such as a main vehicle controller. Next, at 702, an input command may be sent to controller 255 located on disconnect 200 as previously described. The input command may be an operator (i.e. driver) request for a change from 4×2 to 4×4 or vice versa. In this system, the command may be sent through a main vehicle controller before being sent to controller 255. As such, the method at 702 may include receiving an input command from the main vehicle controller. Upon receiving the shift command, at 703 it may be determined if 4×4 operation is requested or not. If 4×4 operation is requested, then the process proceeds to 704. Alternatively, if 4×4 operation is not requested, then the process proceeds to 708, which is explained further below. At 704 it may be determined if shifter gear 310 is at the 4×4 position. Referring back to the discussion of bi-polar sensor 620 of FIG. 6, the sensor may detect if a north or south magnet is positioned in front of (or within a reading range of) the sensor, thereby allowing controller 255 to determine if the shifter gear is at a 4×4 position. If the shifter gear is not at the 4×4 position, then at 705 the motor may be turned on in order to rotate and axially move the shifter assembly until cam profile 318 moves enough such that a magnet corresponding with the 4×4 position is reached. Once the shifter gear is in the 4×4 position, then at 706 the motor may be turned off in order to hold the desired 4×4 position. Finally, at 707, the controller may output a 4×4 feedback signal to the main vehicle controller, thereby signifying completion of the shift to 4 WD.

Returning to 703, if 4×4 operation is not requested, then the process proceeds to 708. Subsequently, at 708 the method may include determining if 4×2 operation is requested. If 4×2 operation is not requested (as the vehicle input command of 702), then at 713 an invalid input is detected by the controller. In this situation, at 714 an output fault code may be sent by controller 255 to the external vehicle controller and the process ends. This branch of operation (including steps 713 and 714) allows controller 255 to detect invalid input commands and issue a fault code without allowing the invalid commands to disrupt operation of the controller and the disconnect operation. Alternatively, at 708 if 4×2 operation is detected, then at 709 it may be determined if shifter gear 310 is at the 4×2 position. If the shifter gear is not at the 4×2 position, then at 710 the motor may be turned on in order to rotate and axially move the shifter assembly until cam profile 318 moves enough such that a magnet corresponding to the 4×4 position is reached. For example, referring to FIG. 6, if the shifter gear is at the 4×4 position corresponding to a south magnet initially, then the motor may be turned on to move the shifter gear (along with the cam profile) until a north magnet is positioned in front of the bi-polar sensor, signifying that the shifter gear is at a 4×2 position. Once the 4×4 position is reached, then at 711 the motor may be turned off to hold the desired 4×2 position. Finally, at 712, controller 255 may output a 4×2 feedback signal to the main vehicle controller, thereby signifying completion of the shift to 2 WD.

In this way, method 700 involves receiving a request at hub controller 255 of control assembly 250 from the vehicle controller in order to adjust shifter assembly 270 into a requested position, such as 4×2 or 4×4 positions corresponding to a connected position connecting two rotatable shafts (4×4) or a disconnected position not connecting the two rotatable shafts (4×2). Also, a current position of the shifter assembly may be determined based on an output of magnetic position sensor 620, which may be coupled to control assembly 250. Shifter assembly 270 may include a plurality of magnets disposed around the circumference of the shifter assembly. The magnetic position sensor may output a position signal based on which of the plurality of magnets is closest to the position sensor, thereby determining whether the current position is the connected (4×4) or disconnected (4×2) position. Finally, electric motor 251 may be activated to drive worm gear 234 to rotate in a single direction and axially adjust the shifter assembly into the requested position (4×4 or 4×2) when the current position is different than the requested position. As explained previously, if the requested (desired) position is the same as the current position of the shifter assembly, then no further action is required.

It is understood that shifting method 700 for commanding shifting operation of disconnect 200 via electronic control by controller 255 may be executed according to a number of different control schemes. The scheme shown in FIG. 7 is one example that shows how the disconnect can be controlled to achieve desired shifting operation. Other control schemes may be implemented while maintaining the general operation of the disconnect according to the scope of the present disclosure.

FIG. 8 shows a simple schematic 800 of controller 255 of FIG. 2 according to one embodiment of the present disclosure. Controller 255 may include a microcontroller unit 810 that inputs and outputs signals of motorized disconnect 200, communicates with an external vehicle controller, and performs the processing necessary to operate shifting operations. For example, the microcontroller unit 810 may process incoming data (e.g., received signals) and perform the necessary shifting operations in combination with the various actuators, sensors, and disconnect components described above. In the arrangement displayed in FIG. 8, a vehicle input command signal 720 may be sent to microcontroller unit 810. Input command signal 720 may be sent by the external vehicle controller (external to controller 255), and include a command for 4×4 or 4×2 shifting. As an example, the vehicle may originally be in a 4×2 mode (2 WD mode) and an operator may desire to switch to a 4×4 mode (4 WD mode). Upon the operator input, the vehicle controller may send a command 720 to microcontroller unit 810, the command including a request to shift to a 4×4 mode. Upon receiving and processing the input command, microcontroller unit 810 may accordingly turn on motor 251 to engage the worm drive and move the shifter assembly into the desired position. Upon completion of a shifting event, an output feedback signal 730 may be sent to the external vehicle controller. It is noted that when motor 251 is turned off upon completion of the desired shift, a dynamic braking action may be present since the motor is grounded, as seen in FIG. 8. This dynamic braking allows the shifter assembly to remain stationary while only the clutch ring 330 is allowed to rotate. Furthermore, the worm drive attached to motor 251 may substantially prevent backwards driving of the motor 251 and shifter assembly 270. Particularly, motor 251 may not be driven backwards by axle friction torque acting against shifter assembly 270, thereby allowing the shifter assembly 270 to remain stationary while motor 251 is turned off.

Furthermore, controller 255 may be a smart controller, in that it operates the motor 251 according to a closed loop scheme as opposed to an open loop, time-based scheme. Furthermore, as controller 255 is self-contained and located on disconnect 200, vehicle cost may be reduced as the vehicle controller does not have to incorporate the processing instructions needed to operate disconnect 200. The bi-polar sensor 620 may send a signal to the microcontroller unit 810 including a current (e.g., actual) position of the shifter assembly. For example, the signal received at the microcontroller unit 810 from the bi-polar sensor 620 may be feedback of whether the shifter assembly is in a 4×4, connected mode or a 4×2, disconnected mode. As described above, the 4×4 and 4×2 driving modes may correspond to a south-pole magnetic signal and a north-pole magnetic signal, respectively. The signal sent from the microcontroller 810 and to the motor 251 may then be based on both the position feedback from the bi-polar sensor (e.g., current position of the shifter assembly) and the vehicle input command signal 720 (e.g., requested position of the shifter assembly).

In this way, motorized disconnect assembly 200 provides a compact device for selectively engaging two rotating components. Shifter structure 230 contains shifter assembly 270 and other components for shifting between two different drive modes while remaining compact in design. Furthermore, control assembly 250 may be attached to the periphery of shifter structure 230 while maintaining the compact design since controller 255 and motor 251 can be small compared to the rest of the disconnect assembly. The worm drive for operating the shifter gear may be more reliable than other systems since the worm drive reduces rotational speed while increasing torque by default without the need for complex gear boxes for gear reduction. Also, the worm drive may be quieter than other gear assemblies. For these reasons, the self-contained and compact motorized disconnect system may provide benefits not exhibited by other disconnect systems.

Additionally, the electric motor 251 required to power the shifting action of the disconnect assembly 200 may be contained within the housing 232 (e.g., surrounded by and entirely encased within the housing 2323) of the disconnect assembly and locally controlled by hub controller 255 located on-board the disconnect assembly. The hub controller may include the necessary instructions for receiving command signals from an external vehicle controller, interpret and process those commands, and drive the electric motor while receiving signals from one or more sensors for determining a current operating mode of the disconnect. As such, computing power of the external vehicle controller may be designated for other functions while the hub controller 255 may be dedicated to operation of the motorized disconnect assembly 200.

FIGS. 9-17 show another embodiment of the motorized disconnect assembly in various views along with a related control scheme and electronic diagram. For example, FIGS. 9-17 show an embodiment of the motorized disconnect employed as a wheel end disconnect coupled to a wheel end of a vehicle. Many devices, methods and/or components in FIGS. 1-8 are the same as devices, methods and/or components shown in FIGS. 9-17. Therefore, for the sake of brevity, devices, methods and components of FIGS. 9-17, and that are included in FIGS. 1-8, are labeled the same and the descriptions of these methods, devices and components is omitted in the descriptions of FIGS. 9-17.

FIG. 9 shows an embodiment of a motorized disconnect assembly 900 mounted to a wheel knuckle 925. Specifically, FIG. 9 shows a side view 901, a sectional view 903 taken along section A-A of side view 901, and a blown-up view 905 of sectional view 903 of the motorized disconnect assembly 900 mounted to the knuckle 925. Knuckle 925 may be an intermediate structure to which the wheel and other wheel components are mounted to. For example, while on one side of knuckle 925 the wheel is attached, the other side of knuckle 925 may contain attachment features for connecting to the vehicle suspension, steering system, and braking system. Motorized disconnect assembly 900 may be attached to a side of knuckle 925 for selectively disconnecting two rotating components. In this embodiment, the two rotating components may be an axle half shaft 931 and wheel hub 934. Axle half shaft 931 may be similar to or the same as front axle 134 of FIG. 1 divided into two axles of a bi-axle (half shaft) system. Furthermore, while wheel hub 934 is the second rotating component in this embodiment, a coupler 937 may include gear teeth for selectively meshing with the gear teeth of clutch ring 330. Coupler 937 may be rotatably attached to wheel hub 934 such that rotation of either coupler 937 or wheel hub 934 corresponds to the same rotation of the other component. Wheel hub 934 may be attached to knuckle 925 via wheel bearing 933. In this way, wheel hub 934 may rotate while knuckle 925 remains stationary (non-rotating). For the configuration shown in FIG. 9 and subsequent figures, disconnect assembly 900 may be referred to as an integrated wheel end disconnect.

Figure 10:
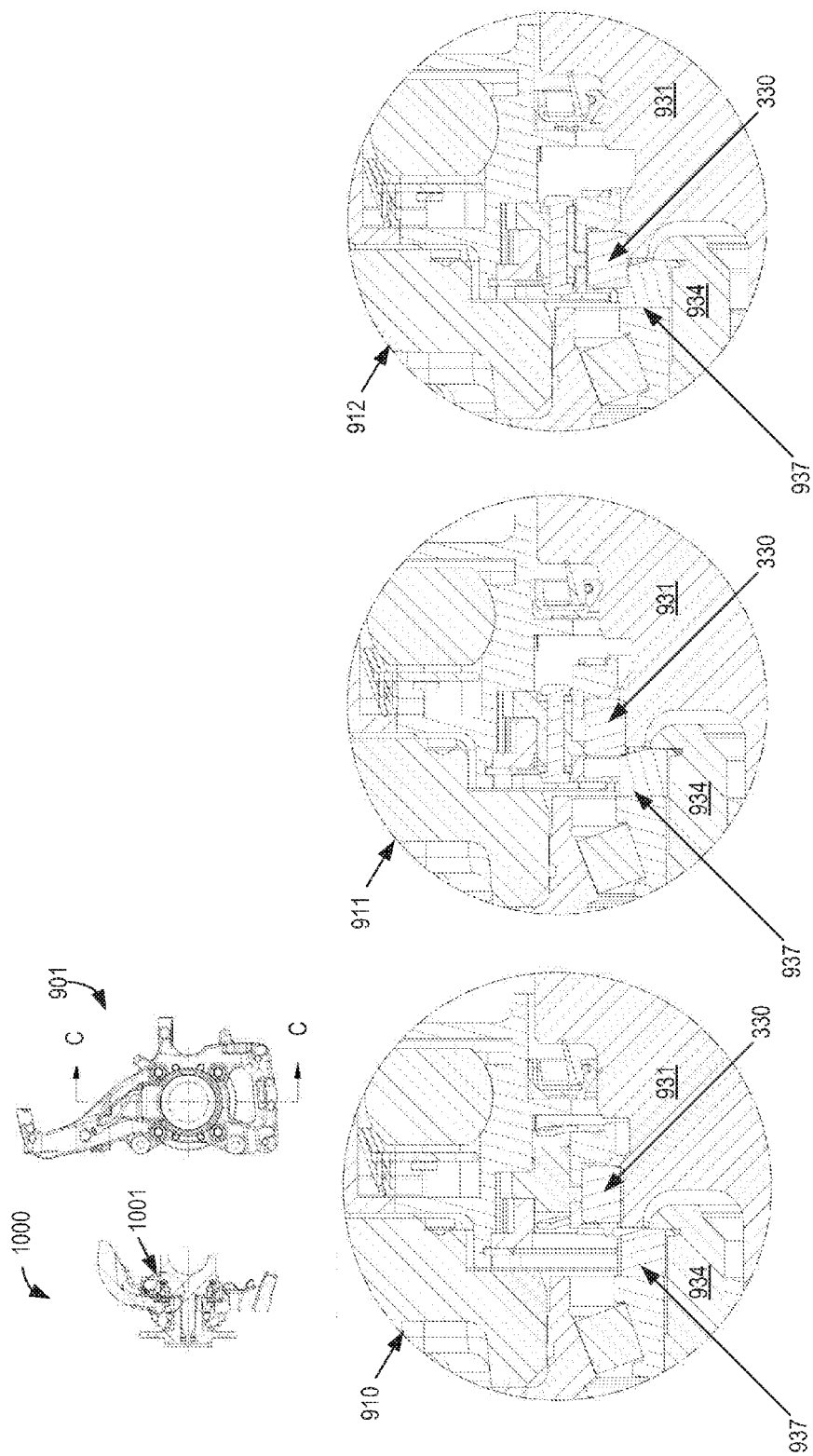
FIG. 10 shows 4×2, 4×4, and blocked shift positions of the motorized disconnect assembly of FIG. 9.

FIG. 10 shows three possible positions of motorized disconnect assembly 900. More specifically, FIG. 10 shows the side view 901 of the knuckle including the motorized disconnect assembly 900 mounted thereto and a cross-section 1000 of the knuckle taken along cutting plane C-C. FIG. 10 shows a series of detailed views, where the location of the detailed view is shown at 1001 in cross-section 1000. The first, 4×2 position is shown in detailed view 910 while the second, 4×4 position is shown in detailed view 912. Referring to view 910, clutch ring 330 is engaged with only axle 931 (the first rotating component) and not engaged with wheel hub 934. During the 4×2 mode corresponding to the 4×2 position of clutch ring 330, rotation of wheel hub 934 may be independent from rotation of axle 931. Referring to view 912, clutch ring 330 is engaged with the gear teeth of both axle 931 and wheel hub 934 via coupler 937. During the 4×4 mode corresponding to the 4×4 position of clutch ring 330, the rate of rotation of wheel hub 934 may be substantially equal to the rate of rotation of axle 931. Additionally, during the 4×4 mode shown in view 912, power (rotational speed and torque) from the engine may be provided to axle 931 and transfer to wheel hub 934 via clutch ring 330. The third detail view 911 shows a blocked shift position, wherein springs 340 may deflect to allow shifter assembly 270 to complete its shifting motion while the clutch ring 330 shift is delayed. For example, during a shift from the 4×2 to 4×4 positions, as shown in detail views 910 and 912, respectively, the gear teeth of clutch ring 330 may not be aligned with the gear teeth of coupler 937. As such, shifter assembly 270 and shifter gear 310 may continue to move axially according to the worm drive while springs 340 deflect against clutch ring 330. Once the gear teeth are appropriately aligned, springs 340 may push the clutch ring 330 into its 4×4 position. In this way, shifter gear 310 may not stop abruptly and cause damage to the worm drive and/or motor 251.

Figure 11:
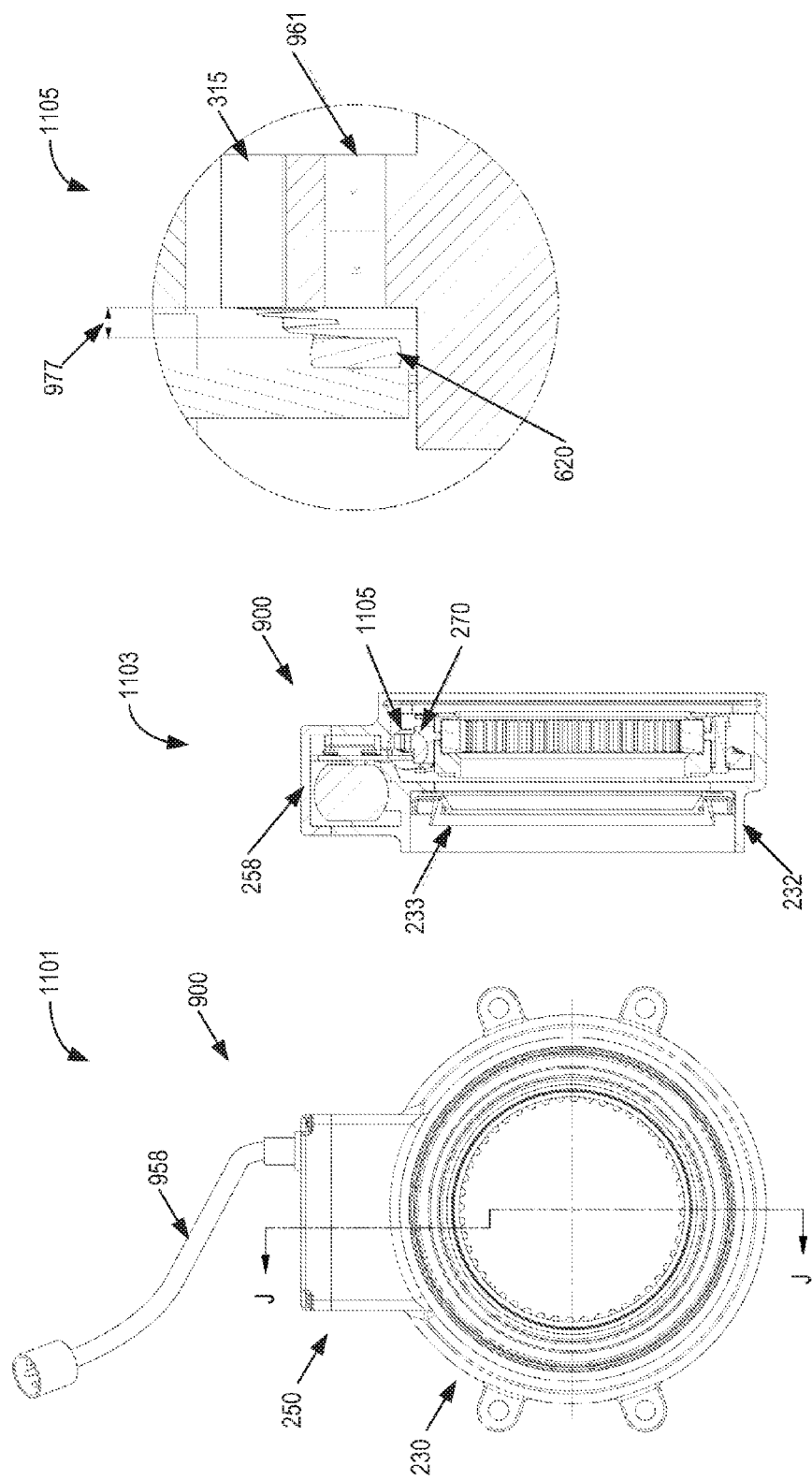
FIG. 11 shows a cross-section and detail view of the motorized disconnect of FIG. 9.

FIG. 11 shows a side view 1101, a sectional view 1103 taken along section J-J in side view 1101, and a detailed view 1105 from sectional view 1103 of motorized disconnect assembly 900. In particular, an electrical cable 958 is shown extending from control assembly 250. Cable 958 may provide the electrical connection between disconnect assembly 900 and the external vehicle controller for providing shifting requests to the disconnect assembly 900. Furthermore, as shown in detailed view 1105 of FIG. 11, magnetic bi-polar sensor 620 is shown attached to an arm extending from control assembly 250. Sensor 620 may be electrically attached to hub controller 255 via the arm. In this way, sensor 620 may be positioned in shifter structure 230 proximate to shifter assembly 270. A series of magnets 961 with North and South polarizations may be positioned along gear track 315, adjacent to cam profile 318. In one example configuration, sensor 620 may be positioned directly adjacent to one of the three fixed cam guides 237. In particular, sensor 620 may be attached to one side of the fixed cam guide 237 closest to control assembly 250. Since gear track 315 is held in between corresponding stationary cam guides 237 and 238, gear track 315 (and cam profile 318) may rotate in between cam guides 237 and 238 while sensor 620 may detect if a North or South magnet 961 passes in front of the sensor 620. In this way, an air gap 977 may be maintained at a substantially constant width in between sensor 620 and magnets 961 to enable proper calibration and function of sensor 620.

In an alternate embodiment, the cap 258 of the control assembly 250 may not include cable 958 and may instead include a built-in receptacle for a wire harness connector to be plugged into the control assembly 250. Said another way, the cap 258 may include an electrical receptacle adapted to receive a wire harness coupled to the external vehicle controller for providing shifting requests to the disconnect assembly 900.

Figure 12:
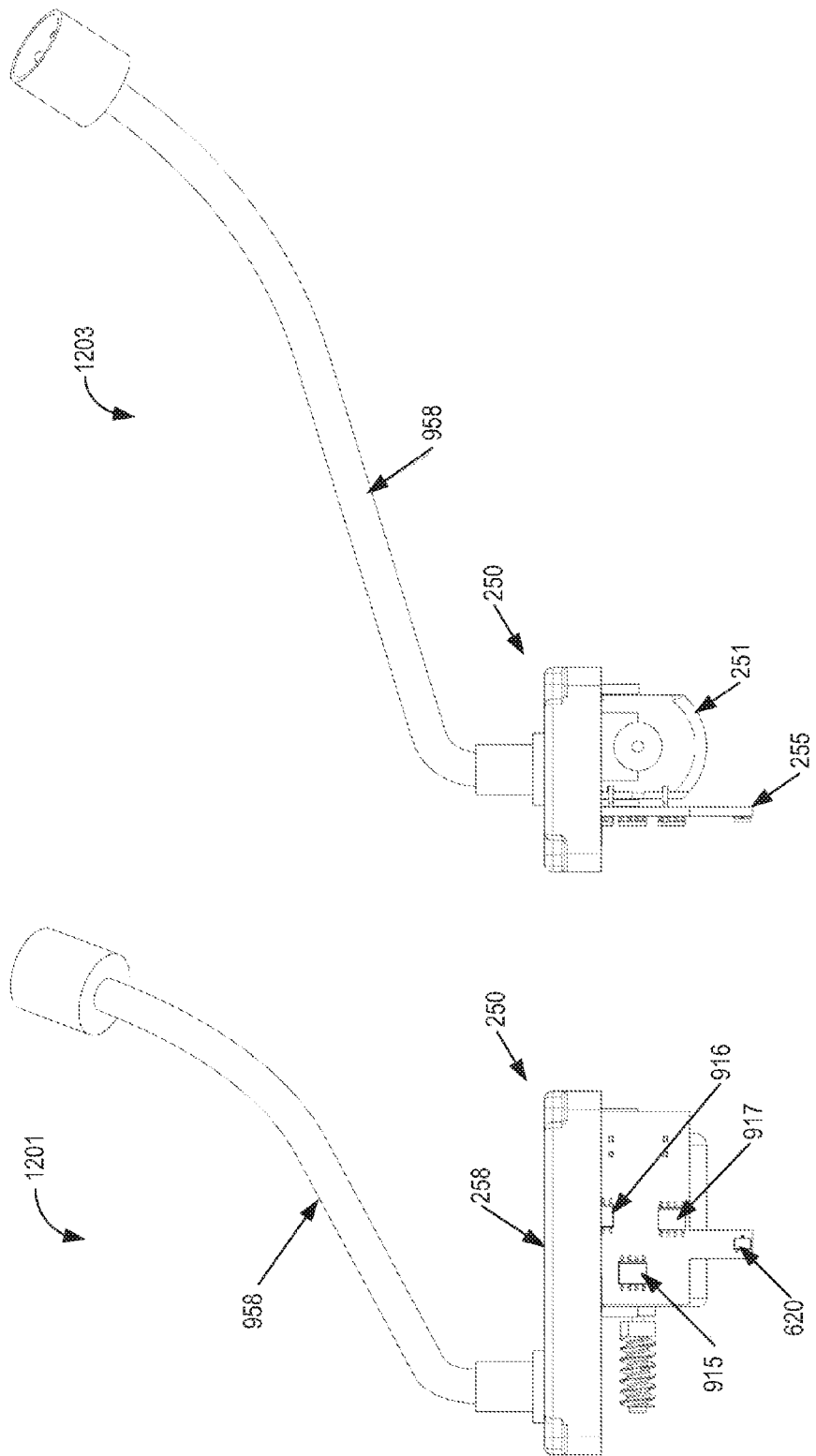
FIG. 12 shows the control assembly of the motorized disconnect of FIG. 9.

FIG. 12 shows a first view 1201 and second view 1203, the first and second views rotated 90 degrees from one another, of control assembly 250. Hub controller 255 may include circuitry and electrical components for commanding several functions of motorized disconnect assembly 900. For example, a power supply 915 may be included in controller 255 for inputting electrical power to control assembly 250 in order to drive motor 251. Furthermore, a motor driver 916 may be included in controller 255 for commanding forward or reverse directionality of motor 251. In other words, motor 251 may power an output shaft in clockwise or counter-clockwise rotational directions. A microprocessor 917 may interpret shifting requests received from the external vehicle controller via cable 958 and process those requests to send commands to other components located in controller 255. As seen in FIG. 12, magnetic bi-polar sensor 620 is attached to an arm that connects to controller 255. The arm may extend such that sensor 620 is adjacent to the circumference of shifter assembly 270.

Figure 13:
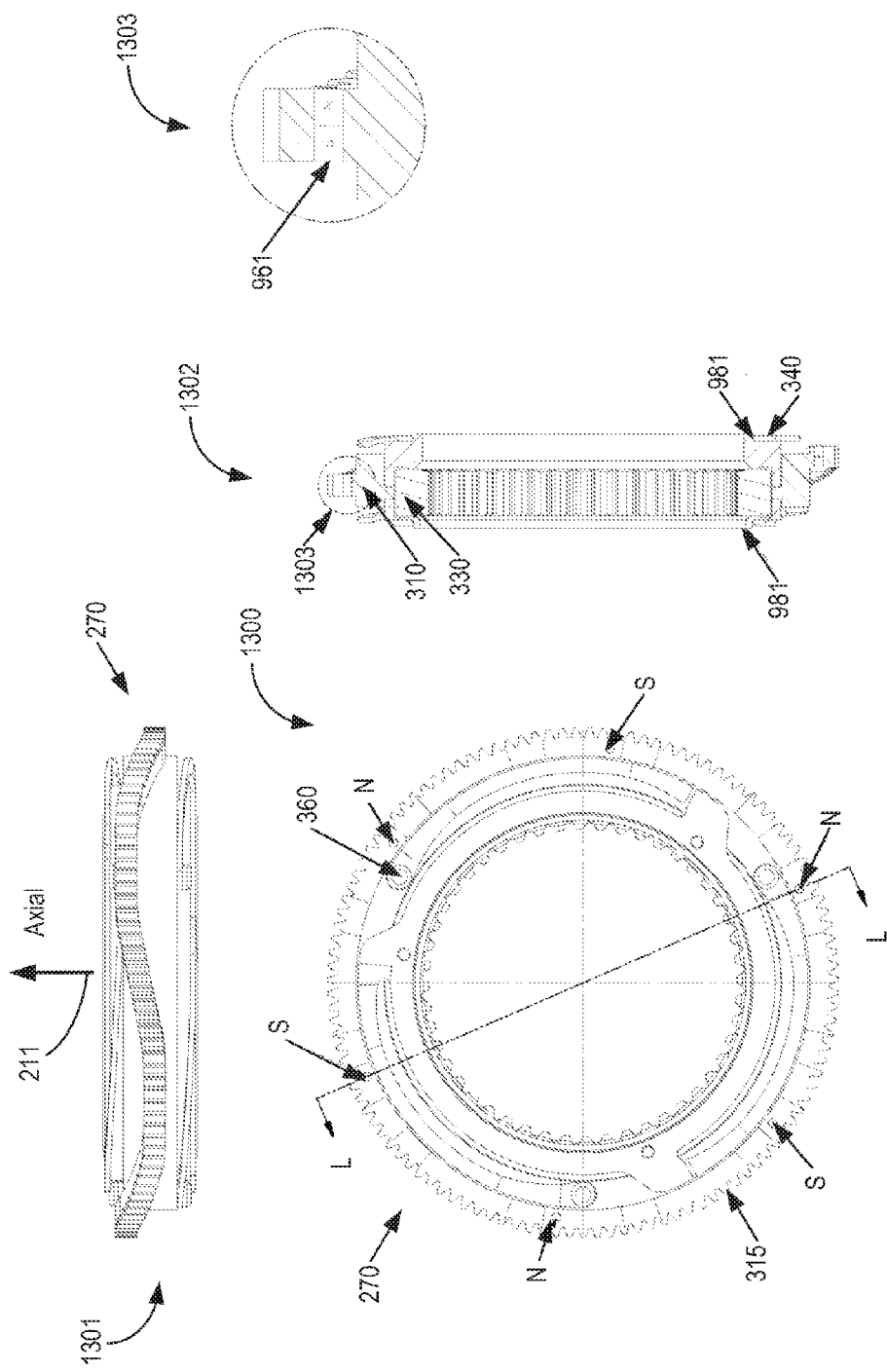
FIG. 13 shows a series of magnets positioned around a shifter assembly of the motorized disconnect of FIG. 9.

FIG. 13 shows a top view 1301, side view 1300, cross-sectional view 1302 taken along section L-L in side view 1300, and a detailed view 1303 of a portion of cross-sectional view 1302 of the shifter assembly 270 outside of shifter structure 230. Magnets 961 with North (N) and South (S) polarizations are seen in detail M and around the sides of gear track 315. The polarization of magnets 961 alternates around gear track 315, each magnet corresponding to a 4×2 or 4×4 position of the shifter assembly 270. Several 981 may be placed on both ends of shifter assembly 270. Furthermore, a spring 340 is visible in a collapsed or non-deformed position.

Figure 14:
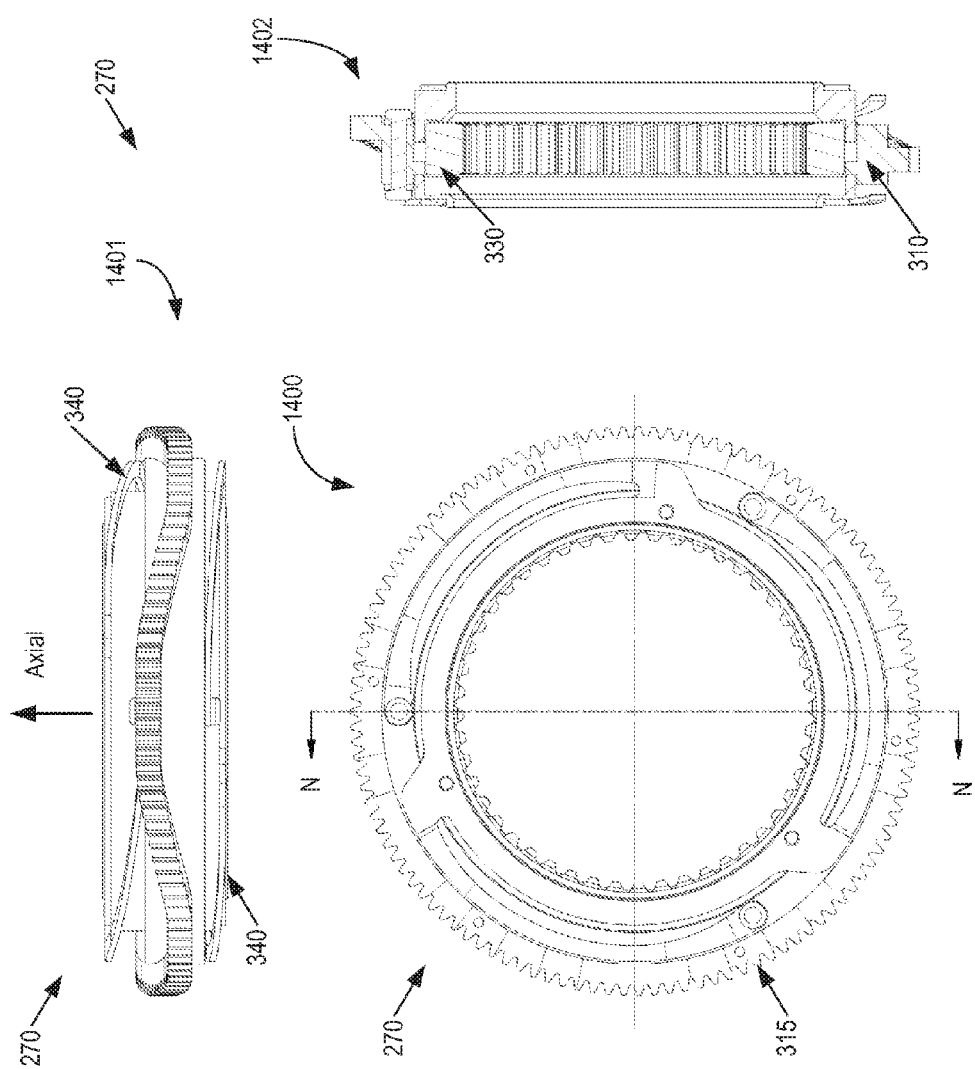
FIG. 14 shows deflected positions of springs of the motorized disconnect of FIG. 9.

FIG. 14 shows a top view 1401, side view 1400, and cross-sectional view 1402 taken along section N-N in side view 1400 of shifter assembly 270, similar to the views seen in FIG. 13. However, springs 340 are shown in their extended, or deformed, positions in FIG. 13. As previously explained, springs 340 may deflect against clutch ring 330 as the rest of shifter assembly 270 moves in the axial direction during a shifting motion. In such a situation, clutch ring 330 may be held stationary in the axial direction until the gear teeth of clutch ring 330 and gear teeth of the second rotating component (coupler 937 attached to wheel hub 934) align, whereupon springs 340 may push clutch ring 330 into the second, 4×4 position.

FIGS. 15 and 16 show an example method 1600 for operating the disconnect assembly 900 and associated components shown in FIGS. 9-14. Method 1600 may share similar steps to method 700 with the addition of determining whether the disconnect assembly 900 is attached to (e.g., installed on) a left or right wheel as well as whether the vehicle is traveling in the forward or backward direction. As such, motor 251 to move shifter assembly 270 to the 4×2 and 4×4 positions may be configured to rotate in both the forward and reverse directions according to whether forward or reverse direction of the vehicle is desired or if the disconnect assembly is attached to the left or right side of the vehicle.

First, at 1501, a series of initialization operations may be performed by controller 255 similar to step 701 of method 700. Again, the initialization operations may include calibration of the bi-polar sensor attached to the controller along with establishing communication between the controller and an external controller, such as a main vehicle controller. Next, at 1502, an input command may be sent to controller 255 located adjacent to disconnect 900. The input command may be an operator (i.e. driver) request for a change from 4×2 to 4×4 or vice versa. In this system, the command may be sent through a main vehicle controller to hub controller 255 via cable 958.

Upon receiving the shift command, at 1503 the method includes determining if 4×4 operation is requested or not. If 4×4 operation is requested, then the process proceeds to 1504. Alternatively, if 4×4 operation is not requested, then the process proceeds to FIG. 16, which is a continuation of method 1500. At 1504, the method includes determining if shifter gear 310 is at the 4×4 position. If the shifter gear 310 is not in the 4×4 position, then at 1507 the method includes determining if the left wheel is selected, that is, if the second rotating component is the left wheel hub (or coupler). If the left wheel is selected, then at 1508 the controller 255 may turn on motor 251 to spin in the clockwise direction, thereby rotating shifter assembly 270 in the same direction as the first rotating component (or front left half shaft). Alternatively, if the right wheel is selected, then controller 255 may turn on motor 251 to spin in the counterclockwise direction, thereby rotating shifter assembly 270 in the same direction as the front right half shaft. It is noted that at steps 1508 and 1509, forward vehicle motion is assumed. If the vehicle is traveling in reverse, then at 1508 the motor may spin in the counterclockwise direction, opposite to what is shown in FIG. 15. Similarly, for reverse vehicle motion, at 1509 the motor may spin in the clockwise direction. In this way, shifter assembly 270 may rotate in the same direction as the first rotating component.

Upon operating motor 251 according to steps 1508 or 1509, then at 1504 the method includes checking again if shifter gear 310 is in the 4×4 position via sensing the alignment of magnets 961 in front of sensor 620. Once shifter gear 310 is in the 4×4 position, then at 1505 the motor may be turned off to hold the desired 4×4 position. Finally, at 1506, the controller may output a 4×4 feedback signal to the main vehicle controller, thereby signifying completion of the shift to 4 WD.

Returning to 1503, if 4×4 operation is not requested, then method 1500 proceeds to FIG. 16, depicting the rest of method 1500. Subsequently, at 1510 the method includes determining if 4×2 operation is requested. If 4×2 operation is not requested, then at 1517 an invalid input is detected by controller 255. In this situation, at 1518 an output fault code may be sent by controller 255 to the external vehicle controller, thereby ending the process. Alternatively, at 1510, if 4×2 operation is detected, then at 1514 the method includes determining if the left wheel is selected, similar to step 1507. If the left wheel is selected, then at 1515 the motor is turned on in the clockwise direction. If the left wheel is not selected and the right wheel is instead selected, then at 1516 the motor is turned on in the counterclockwise direction. As previously mentioned, if the vehicle is traveling in reverse, then the motor directions at steps 1515 and 1516 may also be reversed. Once the shifter gear reaches the 4×2 position as determined by sensor 620, then at 1512 the motor may be turned off to hold the 4×2 position and substantially prevent backwards driving of the motor via dynamic braking. Finally, at 1518, controller 255 may output a 4×2 feedback signal to the main vehicle controller, thereby signifying completion of the shift to 2 WD.

FIG. 17 shows another example of a simplified electrical schematic 1700 of controller 255, including many of the same components shown in FIG. 7. In addition to receiving the input command 720 to switch between 4×2 and 4×4 modes, a second input command 750 may be received by microcontroller unit 810. The second input command 750 may tell unit 810 whether or not the disconnect assembly controller by controller 255 is located on the left or right side of the vehicle. Furthermore, a third input command 760 may be sent to unit 810 by the external vehicle controller, wherein the third input command 760 may tell unit 801 whether the vehicle is traveling in the forward or backward (reverse) direction. With signals 720, 750, and 760 along with the current position of the disconnect assembly as determined by sensor 620, motor 251 may be operated accordingly. It is noted that in this example motor 251 may be rotated in both a clockwise and counterclockwise direction according to the input signals. However, during a commanded mode such as 4×4 on the left wheel in a forward direction, motor 251 may be commanded to rotate in only the appropriate direction (such as clockwise) during the duration of the commanded mode. In this way, motor 251 may be driven in the one direction and held to provide dynamic braking.

The controller schematic of FIG. 17 may provide control for a simplified and low cost bidirectional drive wherein the motor 251 may be driven in two directions depending on the positioning of the disconnect assembly and direction the vehicle is traveling. In other embodiments, signals 750 and 760 to determine the left/right disconnect positioning and forward/backward vehicle movement, respectively, may be replaced by additional pin connections to microcontroller unit 810. As such, rather than receiving signals 750 and 760 from the external vehicle controller, sensors or other devices may be positioned adjacent to the disconnect assembly to detect the axle rotation of the vehicle in order to determine what direction motor 251 spins. Other components may be added, changed, and/or removed from the schematic of FIG. 17 while still conforming to the scope of this disclosure.

In this way, in addition to controlling switching between the 4×2 and 4×4 positions, controller 255 may determine if the disconnect assembly 900 is mounted on the left or right side of the vehicle by receiving a signal from the external vehicle controller via cable 958. Once the mounting position of the disconnect assembly is determined, then controller 255 may instruct motor 251 to rotate in the direction matching the direction of axle rotation while the vehicle is traveling. In a vehicle with multiple disconnect assemblies, such as one for each of the two front wheels, the vehicle control system may instruct the motors to turn one direction for forward vehicle travel and the opposite direction for reverse vehicle travel. As such, the external vehicle controller may include instructions for sending shifting requests to one or more disconnect assemblies located at different parts of the vehicle.

Turning now to FIGS. 18-22, embodiments of a center motorized disconnect 1802 positioned along a vehicle axle are shown. The center motorized disconnect 1802 may have similar components and function similarly to the motorized disconnect assembly described above with reference to FIGS. 2-8. The center motorized disconnect 1802 may also operate similarly and include similar components as the wheel end motorized disconnect shown in FIGS. 9-17. However, instead of selectively disconnecting an axle half shaft and a wheel hub, the center motorized disconnect 1802 may selectively disconnect two portions of an axle (e.g., such as two portions of front axle 134 or rear axle 132 shown in FIG. 1).

Figure 18:
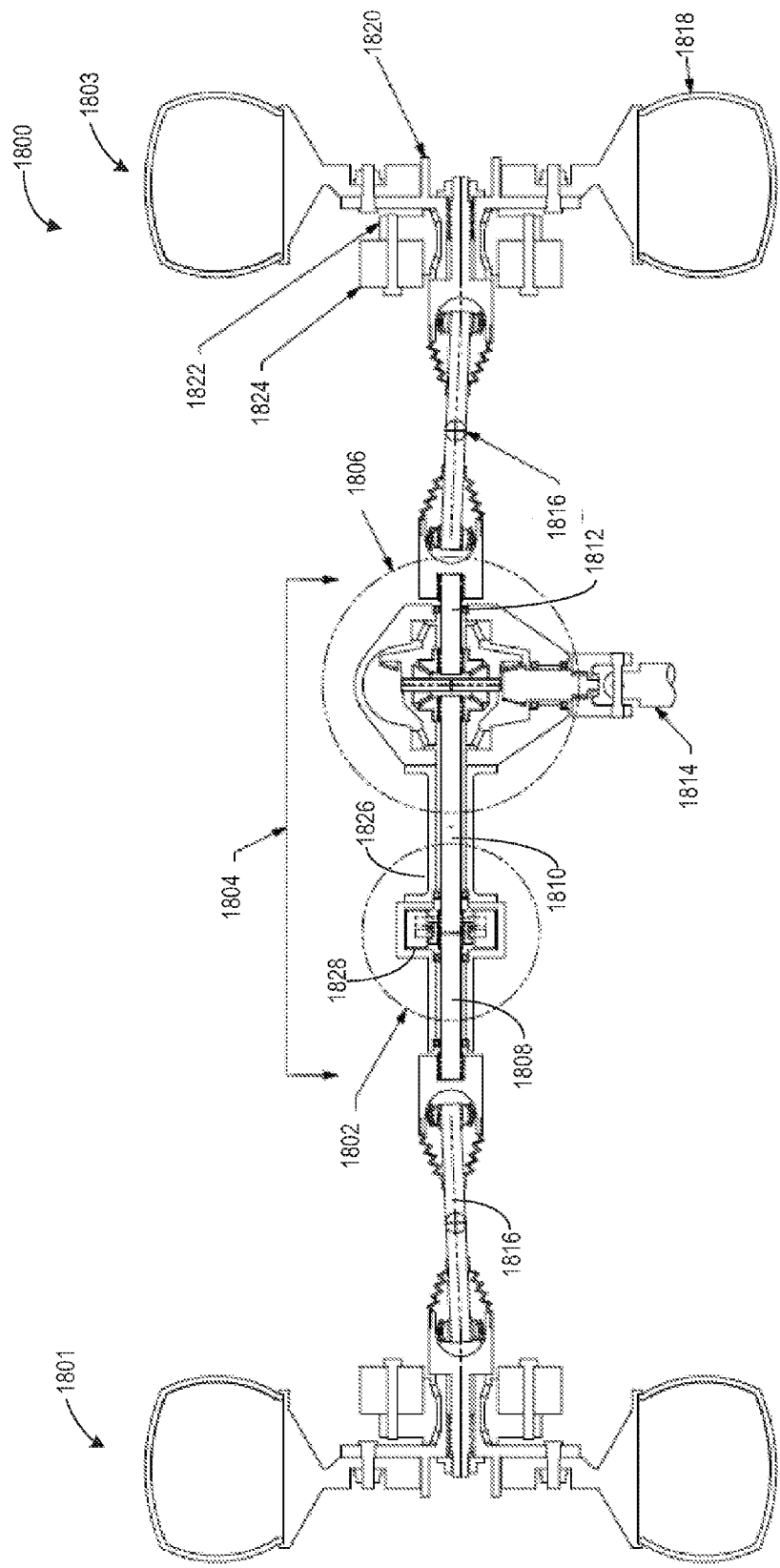
FIGS. 18-22 show schematics of a position of a center motorized disconnect for a vehicle.
Figure 21:
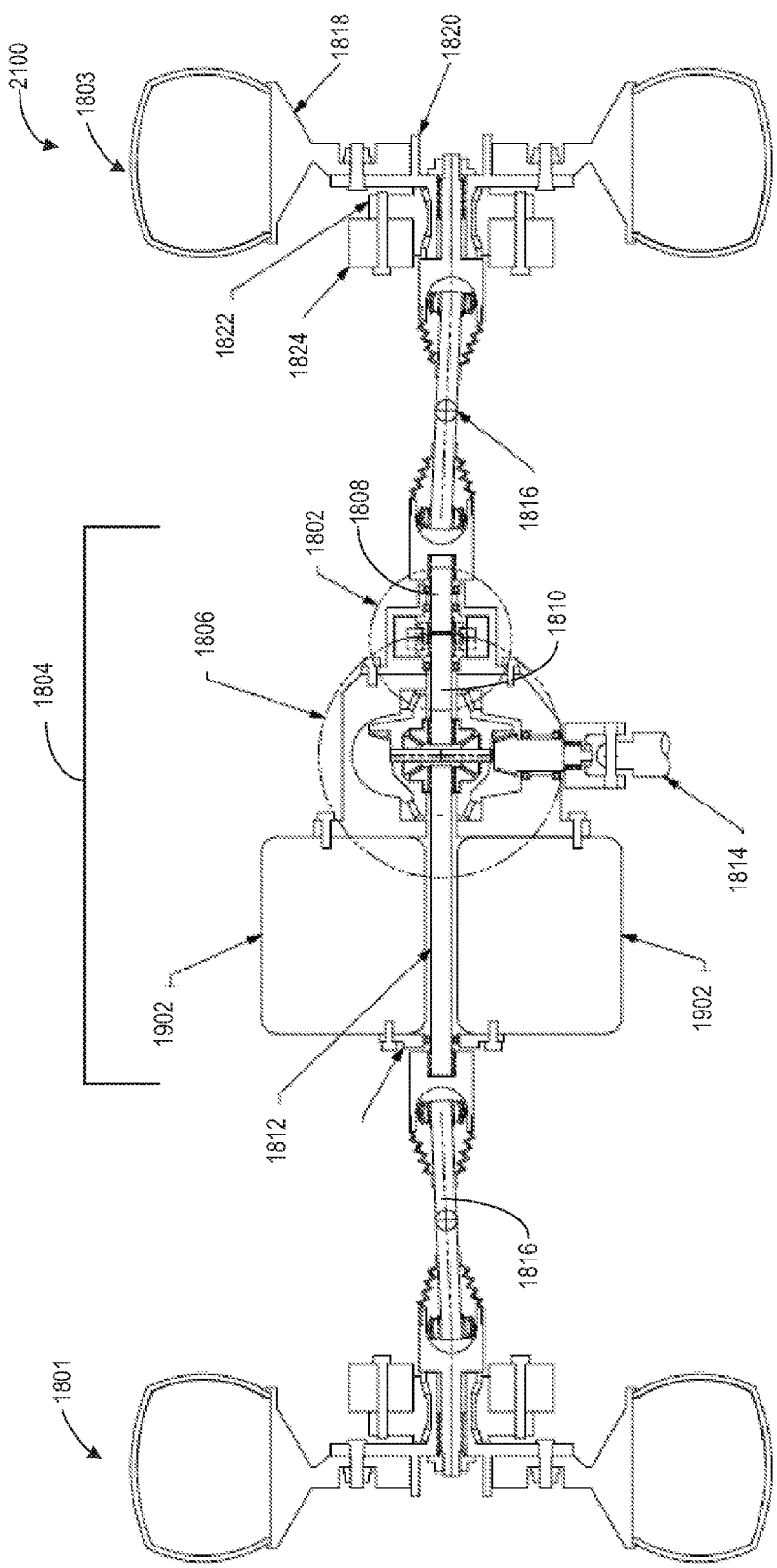

For example, FIG. 18 shows a schematic 1800 of a first embodiment of the center motorized disconnect 1802 positioned along an axle 1804 of a vehicle. For example, the axle 1804 may be a front axle or rear axle of the vehicle. As shown in FIG. 18, the center motorized disconnect 1802 is positioned in a mid-portion of the axle 1804 and away from the wheel and tire 1818 positioned on either end of the axle 1804. The axle 1804 may be coupled on either end of the axle 1804 to a half shaft 1816. Each half shaft 1816 is coupled to a wheel hub 1820 with a knuckle 1824 and wheel bearing 1822 surrounding the connecting shaft between the half shaft 1816 and wheel hub 1820. As shown in FIG. 18, the center motorized disconnect 1802 is positioned to one side of a differential 1806 (e.g., may be front differential 122 or rear differential 121 shown in FIG. 1). In alternate embodiments, the center motorized disconnect may be positioned on the opposite side of the differential 1806, as shown in FIG. 21, described further below.

The differential 1806 is directly coupled to a propeller shaft 1814. The propeller shaft 1814 may be part of or coupled to a front or rear drive shaft of the vehicle (e.g., such as front drive shaft 133 or rear drive shaft 131 shown in FIG. 1). As such, rotative power is translated from a vehicle drive shaft to the differential 1806. The differential 1806, arranged along the axle 1804, then distributes the torque to each of the wheels coupled to the axle 1804. The differential 1806 is coupled on a first side to a stub shaft 1812, the stub shaft 1812 part of the axle 1804 and directly coupled to one of the half shafts 1816. The differential 1806 is directly coupled on a second side, opposite the first side, to an intermediate shaft 1810 of the axle 1804.

The intermediate shaft 1810 is further coupled to the center motorized disconnect 1802. The center motorized disconnect 1802 is also coupled to a coupler shaft 1808, the coupler shaft 1808 directly coupled to another one of the half shafts 1816. As such, the center motorized disconnect may selectively disconnect two rotating components from one another, the two rotating components being the coupler shaft 1808, connected to a first wheel 1801, and the intermediate shaft 1810, coupled to the differential 1806 and thus the drive shaft of the vehicle through the propeller shaft 1814.

The center motorized disconnect 1802 consists of one disconnecting unit opposed to the two units of a hub lock system which has one assembly on each wheel. Since only one disconnecting unit is used, only one wheel (e.g., first wheel 1801) may be disconnected and the other wheel (e.g., second wheel 1803) may remain connected (e.g., to the drive portion of the axle 1804). For example, the center motorized disconnect 1802 shown in FIG. 18 may disconnect the first wheel 1801 from the drivetrain while the second wheel 1803 remains coupled to the drivetrain. The connected second wheel 1803, adjoining half shaft 1816, and stub shaft 1812 turn together, as do the disconnected coupler shaft 1808, adjoining half shaft 1816, and first wheel 1801. The intermediate shaft 1810 turns at the same speed as half shaft 1816 connected to wheel 1803 and stub shaft 1812, but in the opposite direction because of the differential bevel gears. Since the average speed of the intermediate shaft 1810 and stub shaft 1812 may be approximately zero, the differential carrier and propeller shaft 1814 remain motionless. The center motorized disconnect 1802 may offer benefits over the wheel end disconnect shown in FIGS. 9-17, such as reduced overall size, reduced cost, simplified implementation, and reduced shifting noise. Further, as shown in FIG. 18, the center motorized disconnect 1802 and the differential 1806 may be coupled to an axle housing 1826. The center motorized disconnect 1802 includes an actuator 1828 for selectively engaging and disengaging the coupled shaft 1808 and the intermediate shaft 1810, as described further below with reference to FIGS. 23-27.

Figure 19:
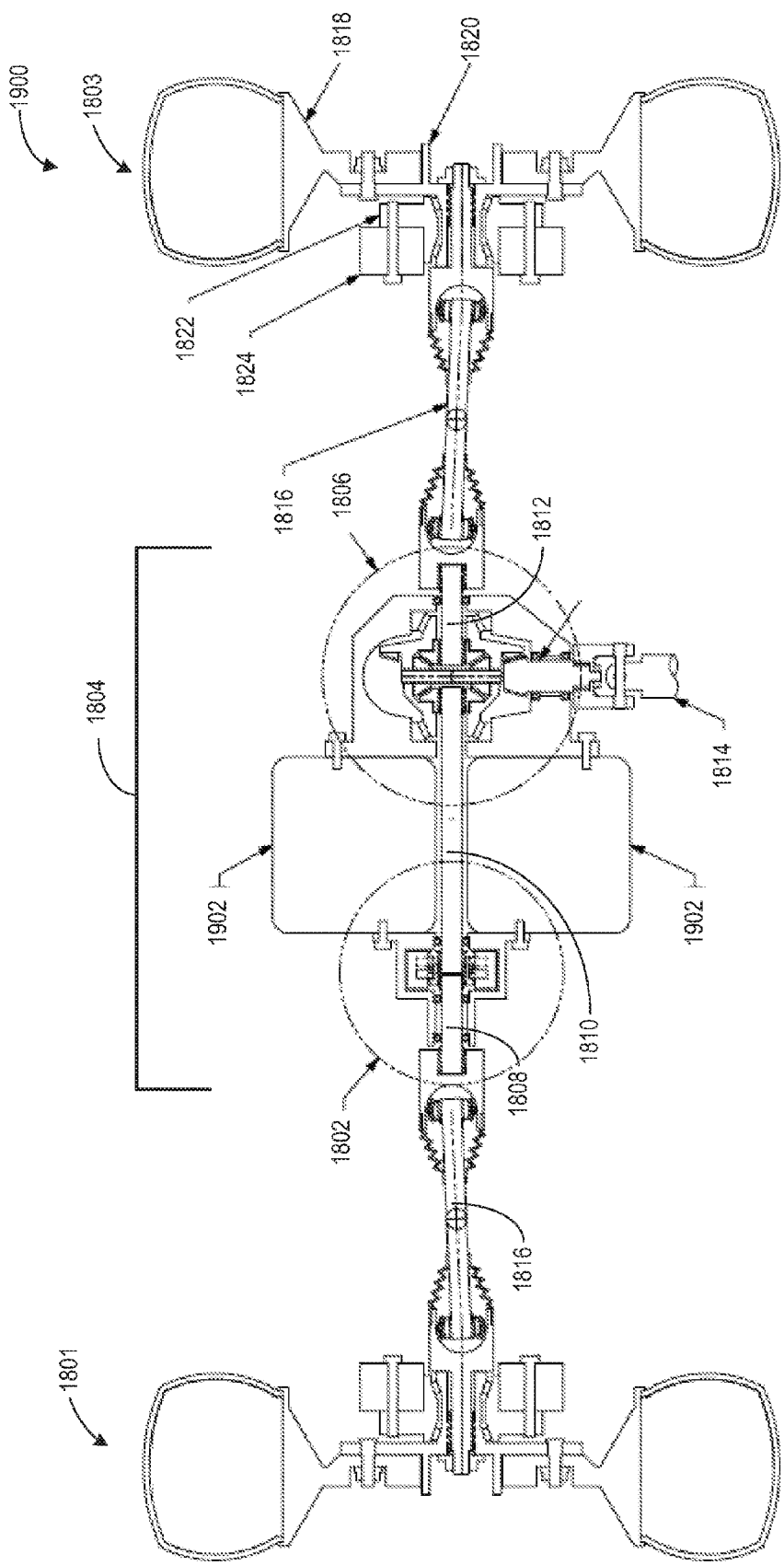

FIG. 19 shows a schematic 1900 a second embodiment of the center motorized disconnect 1802 positioned along the axle 1804 of a vehicle. As shown in FIG. 19, the axle 1804 (specifically, the intermediate shaft 1810 of the axle 1804) is positioned through an engine oil pan 1902. The center motorized disconnect 1802 is positioned on a first side of the engine oil pan 1902 while the differential 1812 is positioned on a second side of the engine oil pan 1902, the second side opposite the first side along a length of the axle 1804.

Figure 20:
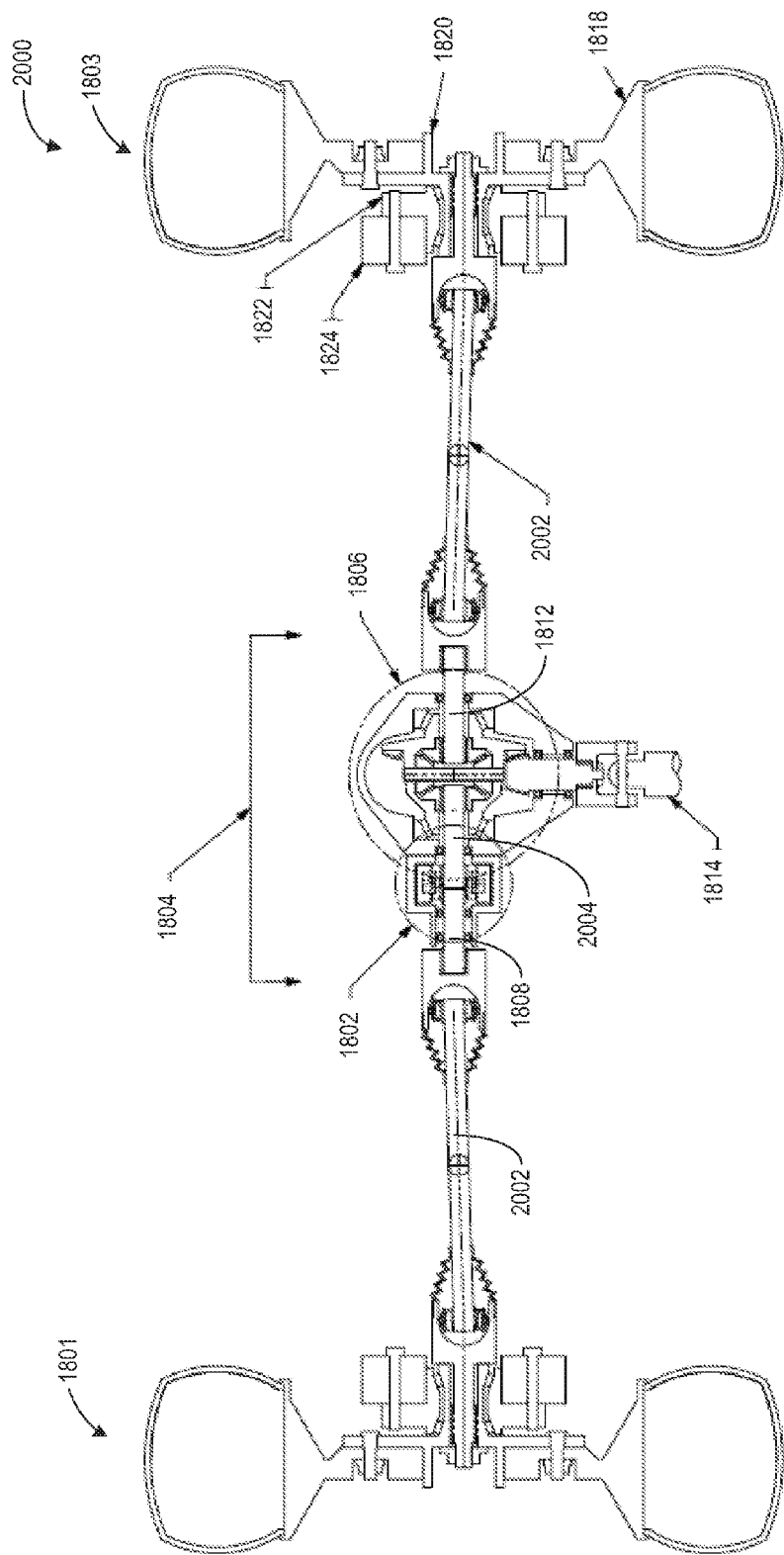

FIG. 20 shows a schematic 2000 of a third embodiment of the center motorized disconnect 1802 positioned along the axle 1804 of a vehicle. The third embodiment is similar to the first embodiment shown in FIG. 18. However, as shown in FIG. 20, the half shafts 2002 may be longer than the half shafts 1816 in FIG. 18. The center motorized disconnect 1802 is positioned closer to the differential 1806 along the intermediate shaft 2004. As such, the intermediate shaft 2004 of FIG. 20 is shorter than the intermediate shaft 1810 of FIG. 18. Further, the overall length of axle 1804 may be shorter in FIG. 20 than in FIG. 18. In this way, the center motorized disconnect 1802 and the differential 1806 may be positioned closer or farther away from one another along the axle 1804.

FIG. 21 shows a schematic 2100 of a fourth embodiment of the center motorized disconnect 1802 positioned along the axle 1804 of a vehicle. In the fourth embodiment, the engine oil pan 1902 is positioned on a first side of the differential 1806 with the stub shaft 1812 running through the engine oil pan 1902. The center motorized disconnect 1802 is positioned on a second side of the differential 1806 and may disconnect the second wheel 1803 from the drivetrain (instead of the first wheel 1801, as shown in the previous FIGS. 18-20).

Figure 22:
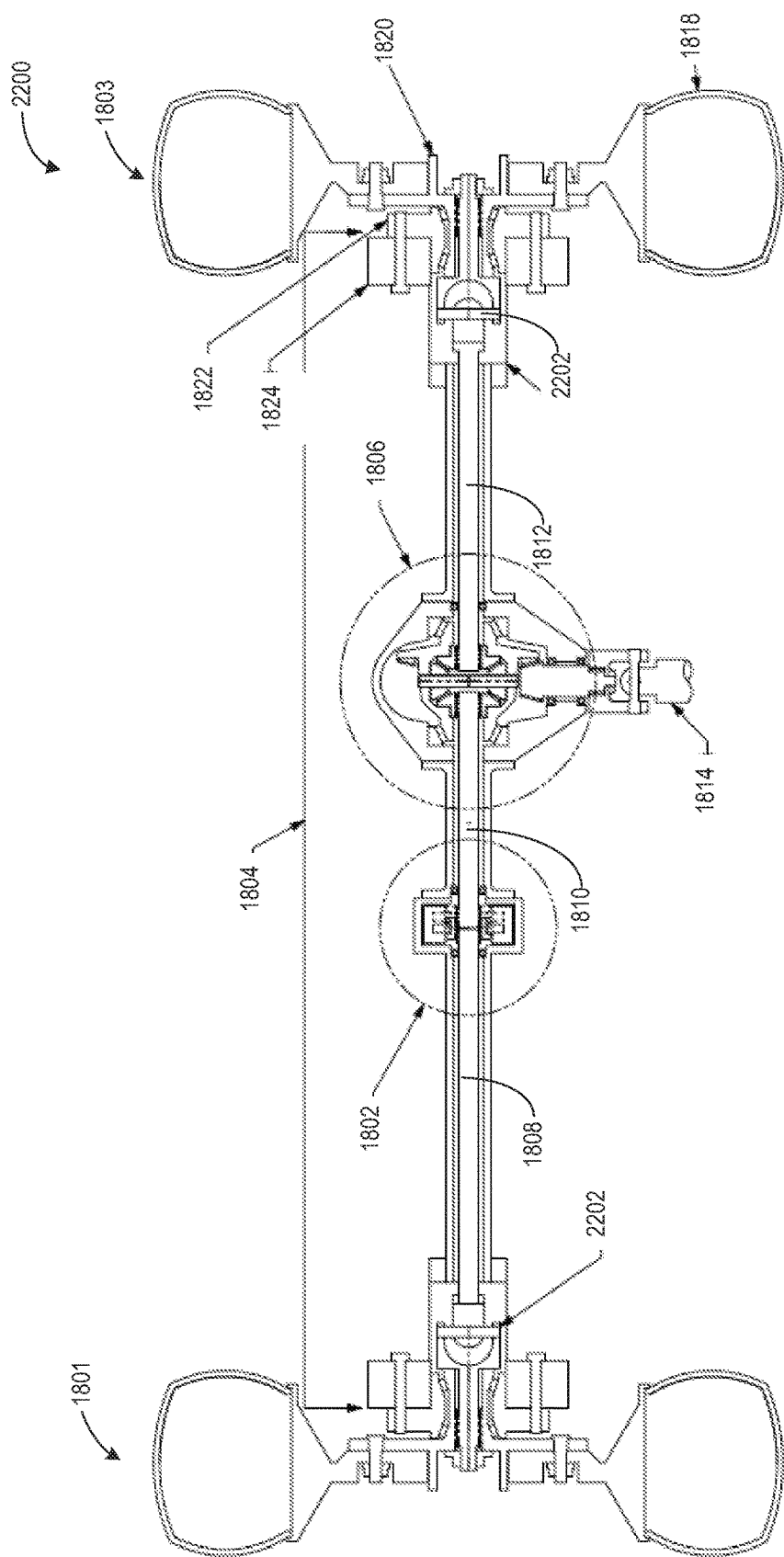

FIG. 22 shows a schematic 2200 of a fifth embodiment of the center motorized disconnect 1802 positioned along the axle 1804 of the vehicle. However, in FIG. 22, the axle 1804 is a monobeam axle coupled directly to a joint 2202 of the wheel hub 1820 and not to a half shaft. As such, the center motorized disconnect 1802 shown in FIG. 22 selectively disconnects the coupler shaft 1808 and intermediate shaft 1810 of the monobeam axle 1804.

Traditional center disconnect systems may move the clutch ring of the system with a gear motor actuator through a shift fork which slides on a shift shaft. However, this arrangement may result in higher cost, higher complexity, and more space required to fit all the system components. Additionally, axle shaft rotation may be effectively isolated from the gear motor actuator. Therefore, the axle shaft rotation may not be used to assist in shifting the clutch ring into engagement or disengagement.

Instead, the center motorized disconnect 1802 shown in greater detail in FIGS. 23-27 may combine the actuator, clutch ring, and shift fork into a single compact assembly. This compact assembly may reduce cost, complexity, and the space required for the assembly along the axle. Further, the center motorized disconnect 1802 described below may use the axle shaft rotation to assist in shifting the clutch ring into engagement or into disengagement. As such, the rotation of the axle 1804 as the vehicle moves down the road may assist in moving the gears and cams of the center motorized disconnect, thereby reducing the load on the motor. Reduced motor load leads to an increase in shift speed and an increase in motor durability.

Figure 23:
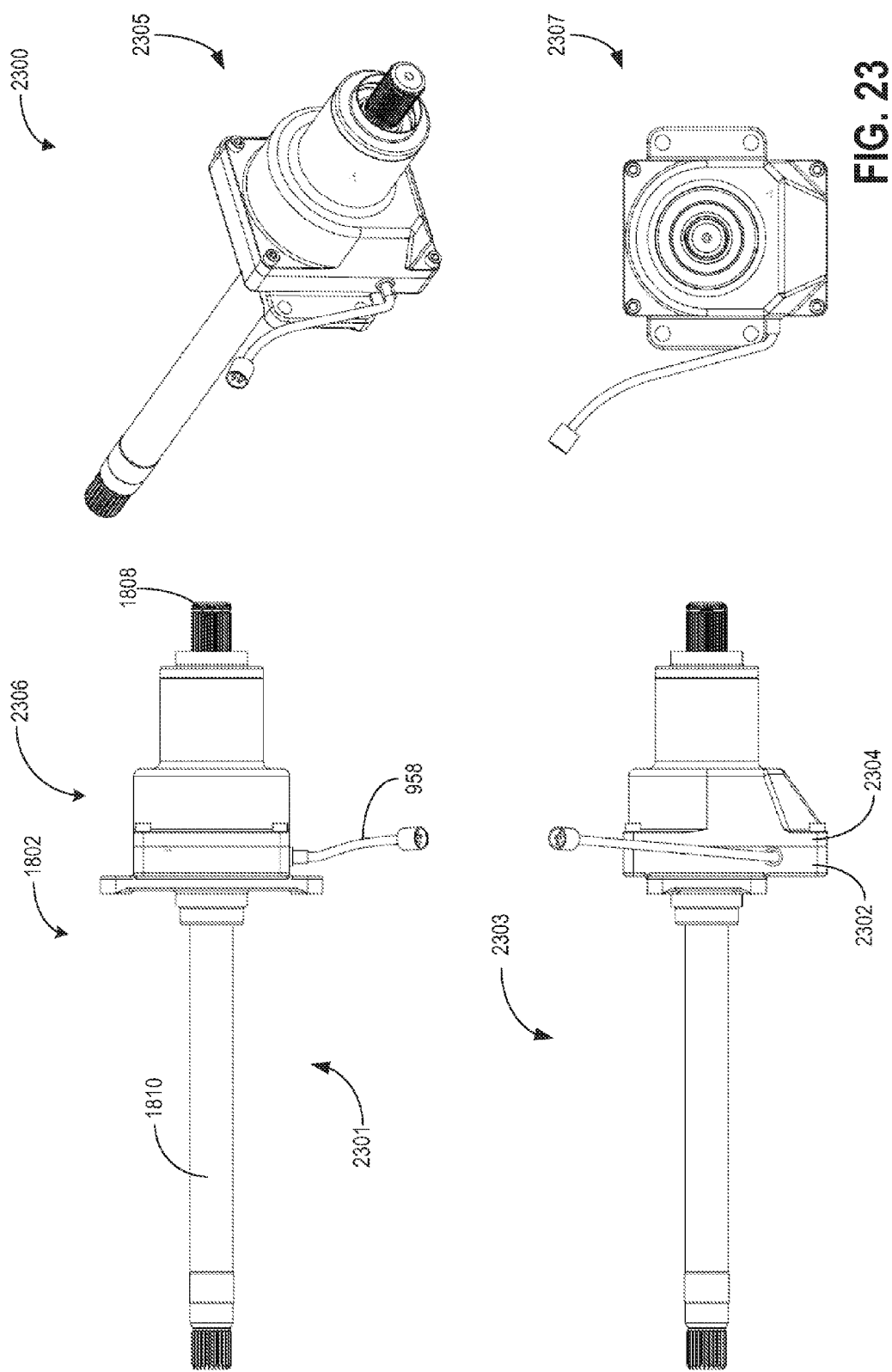

FIGS. 23-27 may include similar components to those described above in FIGS. 2-8 and FIGS. 9-17. As such, similar components have been numbered similarly and may function as described above with reference to FIGS. 2-17. Thus, the center motorized disconnect may operate similarly to as described above with reference to FIGS. 2-17. FIG. 23 shows a schematic 2300 of various exterior views of the center motorized disconnect 1802. Specifically, FIG. 23 includes a first side view 2301, a second side view 2303, rotated around the rotational access of the center motorized disconnect 1802 from the first side view 2301, an isometric view 2305, and an end view 2307. The center motorized disconnect 1802 includes an outer housing 2306 including a base housing 2302 and cover housing 2304. The outer housing 2306 fully encloses (e.g., fully surrounds and encases) the internal components of the center motorized disconnect 1802. The center motorized disconnect 1802 further includes the intermediate shaft 1810 and the coupler shaft 1808, the center motorized disconnect selectively disconnecting the intermediate shaft 1810 and the coupler shaft 1808. An electrical cable 958 is also shown in FIG. 23 which provides the electrical connection between the center motorized disconnect 1802 and the external vehicle controller for providing shifting requests to the disconnect assembly.

In one embodiment, the base housing 2302 (similar to the cap 258 shown in FIG. 2) may include a built-in receptacle for a wire harness connector to be plugged into the base housing 2302 instead of including the electrical cable 958.

Figure 24:
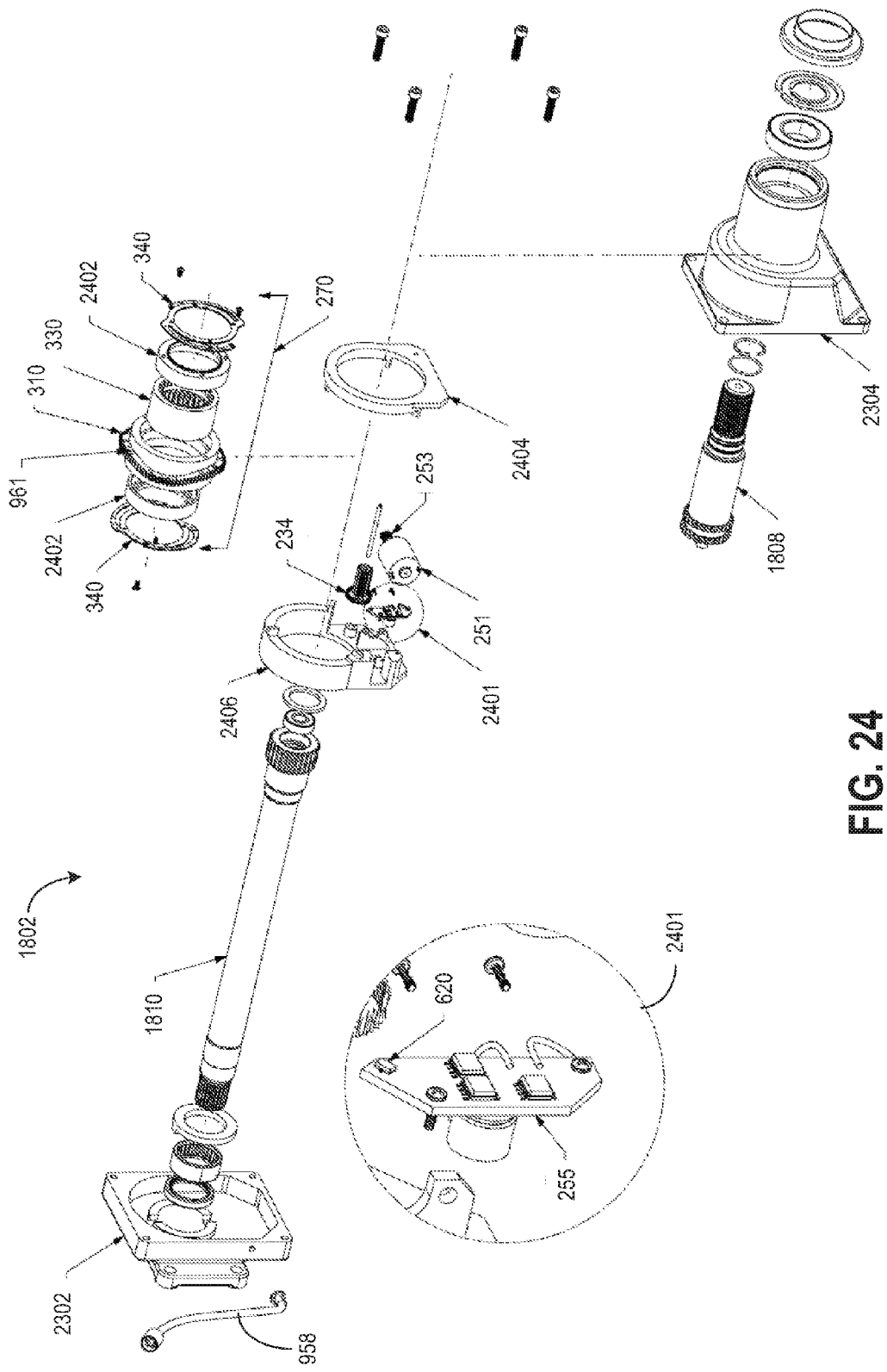

FIG. 24 shows an exploded view of the center motorized disconnect 1802, as well as a detailed view 2401 of a portion of the exploded view. The center motorized disconnect 1802 includes a shifter assembly housing 2406 (may be similar to housing 232 shown in FIG. 2) housing the shifter assembly 270. The shifter assembly 270 includes a shifter gear 310 (may also be referred to as a cam gear) including one or more magnets 961. A clutch ring 330 is positioned inside the shifter gear 310 and bushings 2402 are positioned on either side of the clutch ring 330 (the bushings may be similar to washers 320 and 350 shown in FIG. 3). The shifter assembly 270 further includes two springs 340. A cover cam insert 2404 may be positioned proximate to the shifter assembly 270 and may operate similarly to the cam keeper 235 shown in FIG. 2. The center motorized disconnect further includes a motor 241 driving a worm 253, which in turn drives a worm gear 234. The worm 243 cannot be back driven. In alternate embodiments, the worm 253 may be referred to as the worm gear and the worm gear 234 may be referred to as the drive gear.

A controller 255 (e.g., center disconnect controller) operates the motor 251 and may communicate with a position sensor 620 for sensing the position of the shifter gear 310 via the magnets 961. It should be appreciated that the position sensor 620 and magnets 961 comprise a switching system. In alternate embodiments, an alternate type of switching system, such as a snap switch and actuation points, a contact wiper which follows an encoder, or optical switching, may be used. The controller 255 is used to respond to control inputs to start and stop the motor 251, and to run it in the correct direction. The direction of rotation of the motor 251 may be determined from a vehicle signal indicating forward or reverse vehicle motion. As such, a forward vehicle motion results in forward motor rotation. The motor may run in the reverse direction if the vehicle reverse signal is detected. However, the motor always runs in a direction equal to the vehicle direction and cannot switch directions unless the vehicle direction switches.

The controller 255 may also be configured to detect various types of faults and take corrective measures in response to the detected faults. A stalled motor, for example, may be detected as a fault. In one example, momentary reversal of the motor direction may correct the stalled motor. The controller 255 may include additional sensors such axle speed sensors. Signals from axle speed sensors may be used to further refine the shifting algorithm under certain vehicle conditions. For example, the controller 255 may not allow a mode shift (e.g., 4×4 to 4×2) when the vehicle is stopped or travelling at high speeds.

In some embodiments, an additional, multi-plate clutch may be coupled in series with the shifter assembly 270 including the clutch ring 330. The multi-plate clutch may be configured similar to the multi-plate clutch embodiment described above with reference to FIGS. 2-3.

In this way, the technical effect of the motorized disconnect assembly is efficiently and accurately engaging and disengaging two rotating components of a vehicle drivetrain. As explained above, the motorized disconnect assembly is actuatable via an electric motor instead of vacuum, which may not be readily available in a vehicle.

Figure 25:
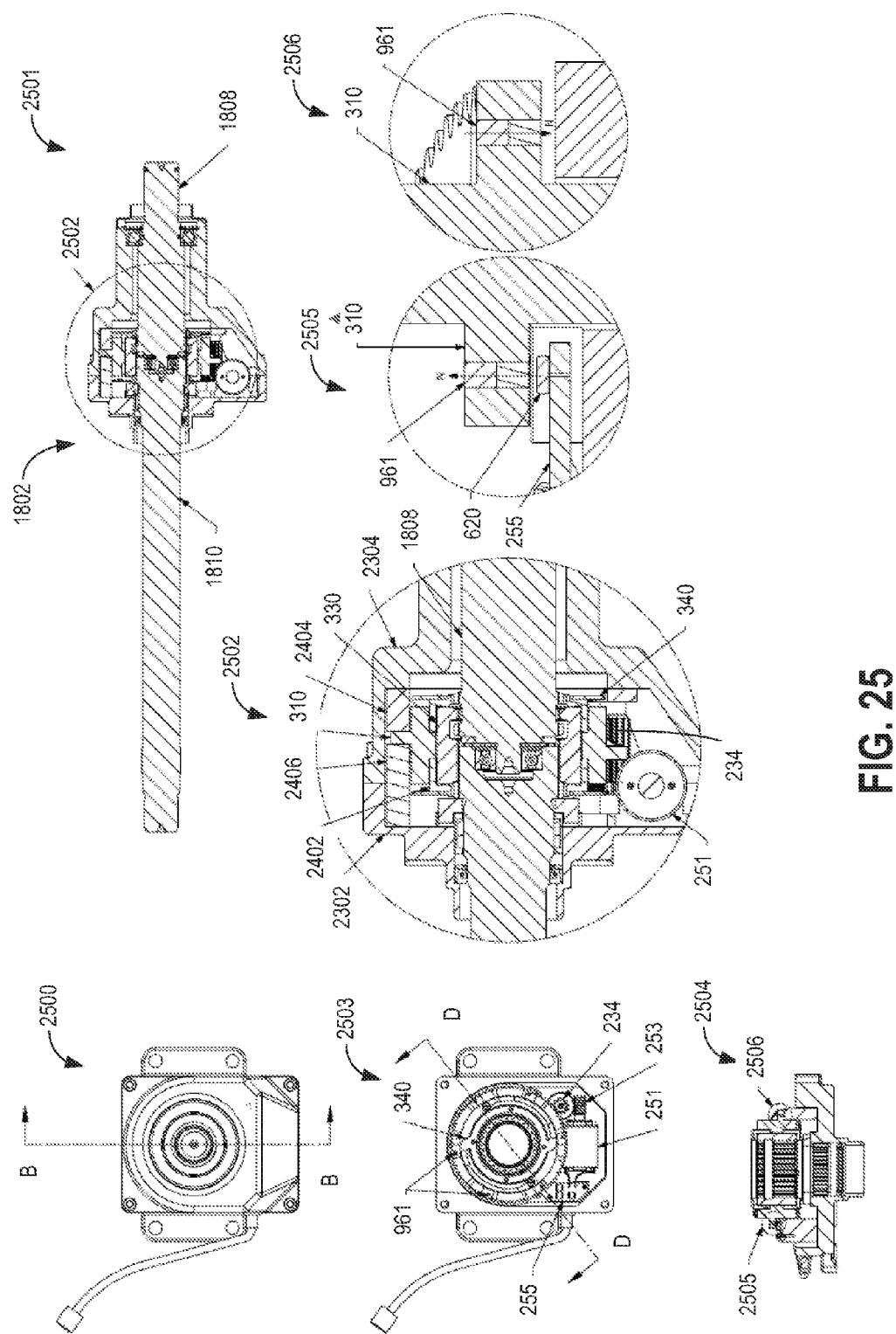
Figure 26:
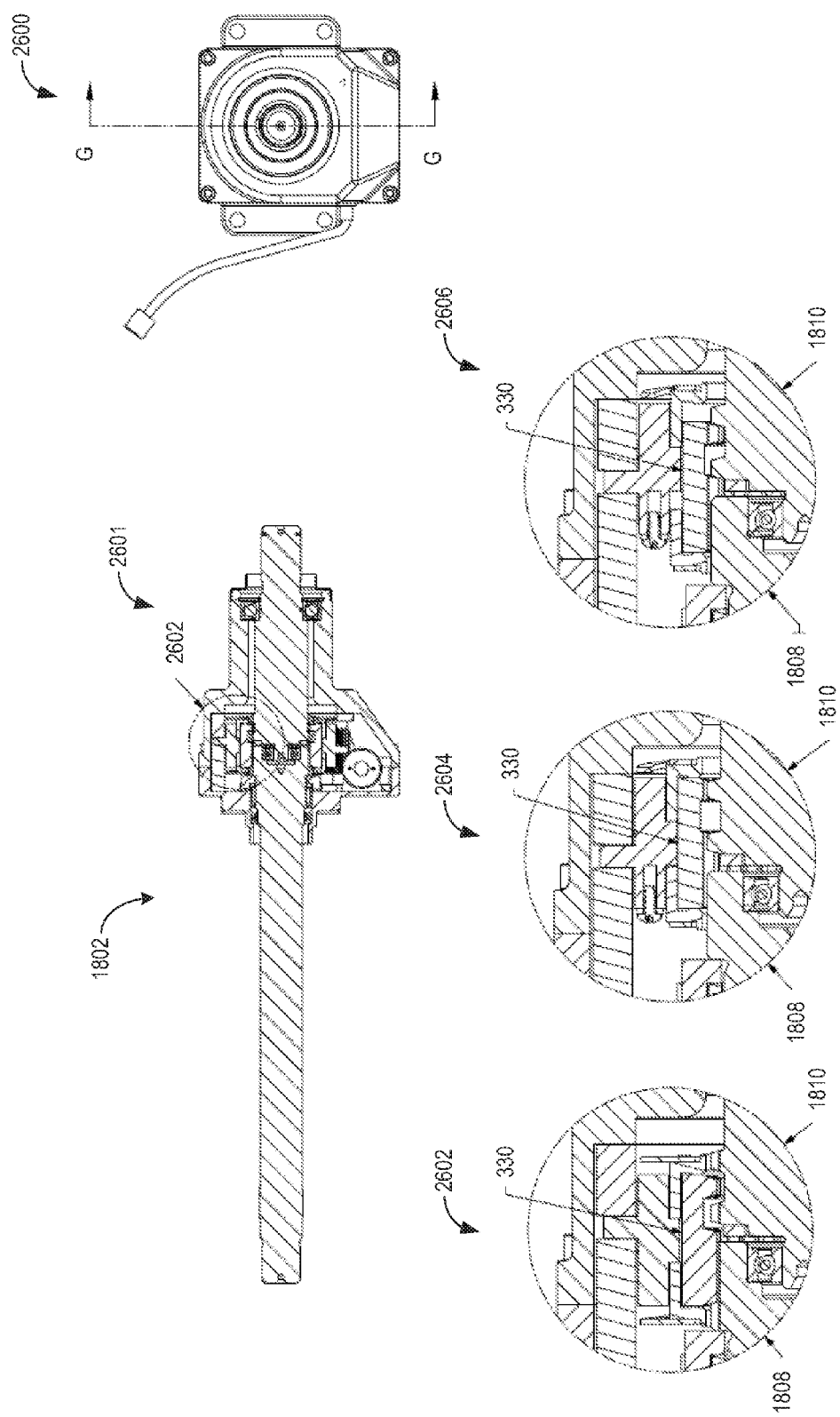

FIGS. 25-27 show various cross-sectional views of the center motorized disconnect 1802 described above. Specifically, FIG. 25 shows a first end view 2500, a first cross-sectional view 2401 taken along section line B-B shown in first end view 2500, and a first detailed view 2502 of a portion of the first cross-sectional view 2401 of the center motorized disconnect 1802. As shown in the first detailed view 2502, the clutch ring is radially interior to and concentric with the shifter gear 310. FIG. 25 further shows a second end view 2503 with components removed for clarity, a second cross-sectional view 2404 taken along section line D-D shown in second end view 2503, and a second detailed view 2505 and third detailed view 2506 of portions of the second detailed view 2505. In particular, second detailed view 2505 shows a proximity of one magnet 961 to the position sensor 960, where a south pole of the magnet is proximate to the position sensor 960.

FIGS. 26-27 show a first end view 2600 of the center motorized disconnect 1802. Further, FIGS. 26-27 shows a first cross-sectional view 2601 where the disconnect is in the 4×2 configuration, a second cross-sectional view 2603 where the disconnect is in the 4×4 configuration, and a third cross-sectional view 2605 where the disconnect is in the blocked shift conditions, each of the cross-sectional views taken along line section G-G of first end view 2600. FIG. 26 further shows a first detailed view 2602 of the disconnect in the 4×2 configuration, a second detailed view 2604 of the disconnect in the 4×4 configuration, and a third detailed view 2606 of the disconnect in the blocked shift condition. These three configurations may be the similar to the shift configurations described above with reference to FIG. 10. For example, in the 4×2 configuration, the clutch ring 330 is not engaged with both the intermediate shaft 1810 and the coupler shaft 1808. In the 4×4 configuration, the clutch ring 330 is fully engaged with both the intermediate shaft 1810 and the coupler shaft 1808.

Additional components not described herein may be included in the center motorized disconnect 1802. Further, additional components shown in FIGS. 2-17 may be included in the center motorized disconnect 1802. Further still, components of the center motorized disconnect 1802 may be included in the wheel end disconnect embodiment shown in FIGS. 9-14.

As one embodiment, a motorized disconnect assembly comprises: a shifter assembly including an undulating gear track undulating between two ends of the shifter assembly in a direction of a rotation axis of an interfacing shaft, the gear track trapped between fixed cam guides. In a further embodiment of the above embodiment, the undulating gear track is in contact with a worm gear in contact with a worm. In any of the above embodiments, the worm is connected to an output shaft of an electric motor. Additionally, in any of the above embodiments, the electric motor is adapted to rotate in a single direction while the interfacing shaft rotates in the single direction.

As another embodiment, a method for selectively engaging two shafts comprises: during a first mode, holding a shifter assembly in a first position where the shifter assembly is engaged only with a first shaft via a worm gear driven by a motor adapted to rotate the worm gear in a first direction; upon receiving a command to shift to a second mode, driving the worm gear into contact with a gear track of the shifter assembly, the gear track oscillating between two ends of the shifter assembly, and moving the shifter assembly in a first axial direction and into a second position where the shifter assembly is engaged with both the first shaft and a second shaft; and upon receiving a command to shift back to the first mode, driving the worm gear in the first direction, and moving the shifter assembly in a second axial direction until the shifter assembly reaches the first position, the second axial direction opposite the first axial direction. In a further embodiment of the above embodiment, the first mode is a two-wheel drive mode and the second mode is a four-wheel drive mode. As another further embodiment of any of the above embodiments, the command to shift to the second mode and the command to shift back to the first mode is received by a controller coupled to the shifter assembly, the controller operating the motor. As yet another embodiment of any of the above embodiments, the controller further includes programming for communicating with an external vehicle controller for receiving the commands to shift to the first and second modes. As another embodiment of any of the above embodiments, the controller further includes inputs for receiving signals from a magnetic position sensor to determine if the shifter assembly has reached the first or second positions. Further, in another embodiment of any of the above embodiments, the shifter assembly includes an even number of magnets attached around a circumference of the shifter assembly, the magnets aligning with the magnetic position sensor upon rotation of the shifter assembly.

As yet another embodiment, a motorized disconnect assembly, comprises: an electric motor; a worm drive including a worm and a worm gear, the worm connected to an output shaft of the electric motor and the worm gear; a shifter assembly including a gear track in contact with the worm gear, the gear track oscillating between two ends of the shifter assembly, and a clutch ring for selectively engaging a first shaft in a first mode and engaging both the first shaft and a second shaft in a second mode, the two modes corresponding to moving the shifter assembly linearly into a first position and a second position, the first position located at a different axial position than the second position; and a controller with computer-readable instructions stored in non-transitory memory for adjusting the shifter assembly into the first and second positions based on a request from a control system external to the motorized disconnect assembly. In a further embodiment of the above embodiment, the assembly further comprises one or more springs for axially positioning the clutch ring when teeth of the clutch ring misalign with teeth of the second shaft, wherein axial movement of the clutch ring occurs after axial movement of the shifter assembly upon alignment of the teeth of the clutch ring and second shaft. In an additional embodiment of any of the above embodiments, the clutch ring rotates independent of the shifter assembly. As yet another embodiment of any of the above embodiments, the clutch ring moves axially with the shifter assembly. In a further embodiment of any of the above embodiments, the assembly further comprises a housing shaped to contain the shifter assembly. As still another embodiment of any of the above embodiments, the assembly further comprises a seal located on a side of the housing, the seal in contact with the first shaft.

As another embodiment, a system comprises: a controller (e.g., hub controller) disposed on a motorized disconnect assembly of a vehicle and that is operable to: activate an electric motor to rotate a worm gear coupled to the motor in a first direction in order to engage and rotatably couple a first shaft with a second shaft, the worm gear coupled to an oscillating gear track of a shifter assembly, the oscillating gear track coupled to a clutch ring adapted to engage with the second shaft; and activate the electric motor to continue rotating the worm gear in the first direction in order to disengage the clutch ring from the second shaft and decouple the first shaft and the second shaft. In a further embodiment of the above embodiment, the controller is in communicative connection with a vehicle controller located external to the motorized disconnect assembly. As yet another embodiment of any of the above embodiments, the electric motor turns an output shaft equipped with a worm engaged with the worm gear. As a further embodiment of any of the above embodiments, the system further comprises a control assembly containing the hub controller. In a further embodiment of any of the above embodiments, the control assembly further includes a housing attached to a shifter structure of the motorized disconnect assembly.

As yet another embodiment, a method for operating a motorized disconnect assembly, comprises: receiving a request at a hub controller of a control assembly of the disconnect assembly from a vehicle controller to adjust a shifter assembly coupled to the control assembly into a requested position, the requested position being one of a connected position connecting two rotatable shafts or a disconnected position not connecting the two rotatable shafts; determining a current position of the shifter assembly based on an output of a magnetic position sensor coupled to the control assembly, the shifter assembly including a plurality of magnets disposed around a circumference of the shifter assembly; and activating an electric motor included in the control assembly and coupled to the shifter assembly via a worm gear to rotate in a single direction and axially adjust the shifter assembly into the requested position when the current position is different than the requested position. In a further embodiment of the above embodiment, the vehicle controller is located external to the motorized disconnect assembly and includes instructions for sending shifting requests to one or more disconnect assemblies separate from the motorized disconnect assembly. As another embodiment of any of the above embodiments, the connected position corresponds to a four-wheel drive mode of a vehicle. In an additional embodiment of any of the above embodiments, the disconnected position corresponds to a two-wheel drive mode of a vehicle. In yet another embodiment of any of the above embodiments, the shifter assembly includes an undulating gear track in contact with the worm gear, the undulating gear track including repeating undulations around an outer circumference of the shifter assembly.

As another embodiment, a system comprises: a controller disposed on a center motorized disconnect assembly of a vehicle, the center motorized disconnect assembly positioned along a mid-portion of a vehicle axle and proximate to a differential positioned between the axle and a drive shaft of the vehicle, the controller operable to: activate an electric motor to rotate a worm gear coupled to the motor in a first direction in order to engage and rotatably couple a first shaft with a second shaft, the worm gear coupled to an oscillating gear track of a shifter assembly, the oscillating gear track coupled to a clutch ring adapted to engage with the second shaft; and activate the electric motor to continue rotating the worm gear in the first direction in order to disengage the clutch ring from the second shaft and decouple the first shaft and the second shaft. In a further embodiment of the above embodiments, the controller is in communicative connection with a vehicle controller located external to the motorized disconnect assembly. In yet another embodiment of any of the above embodiments, the electric motor turns an output shaft equipped with a worm engaged with the worm gear. In still another embodiment of any of the above embodiments, the controller receives a vehicle signal indicating forward or reverse vehicle motion and in response, drives the electric motor in a same direction as a direction of the vehicle motion. In an additional embodiment of any of the above embodiments, the control assembly further includes a shifter assembly housing attached to the shifter assembly of the motorized disconnect assembly.

As yet another embodiment, a center motorized disconnect assembly, comprises: an electric motor; a worm drive including a worm and a worm gear, the worm connected to an output shaft of the electric motor and the worm gear; a shifter assembly including a gear track in contact with the worm gear, the gear track oscillating between two ends of the shifter assembly, and a clutch ring for selectively engaging an intermediate shaft of an axle in a first mode and engaging both the intermediate shaft and a coupler shaft of the axle in a second mode, the coupler shaft coupled to a wheel, the two modes corresponding to moving the shifter assembly linearly into a first position and a second position, the first position located at a different axial position than the second position; a controller with computer-readable instructions stored in non-transitory memory for adjusting the shifter assembly into the first and second positions based on a request from a control system external to the motorized disconnect assembly; and an outer casing fully encasing the electric motor, worm drive, and shifter assembly, the outer casing arranged along a mid-portion of the axle proximate to a differential arranged between the axle and a drive shaft. In a further embodiment of the above embodiment, the coupler shaft is coupled to a half shaft, the half shaft coupled to the wheel, and wherein the intermediate shaft is coupled to the differential, the differential arranged between the intermediate shaft and a stub shaft of the axle and further coupled to the drive shaft of the vehicle. In another embodiment of any of the above embodiments, the intermediate shaft runs through an engine oil pan and wherein the motorized disconnect assembly and differential are arranged on opposite ends of the engine oil pan along a length of the axle. In yet another embodiment of any of the above embodiments, the stub shaft runs through the engine oil pan positioned on a first side of the differential and the motorized disconnect assembly is arranged on a second side of the differential, opposite the first side. In a further embodiment of any of the above embodiments, the axle is a monobeam not including any half shafts and wherein the coupler shaft is coupled directly to a u-joint of a wheel hub of the wheel.

The control methods and routines disclosed herein may be stored as executable instructions in non-transitory memory and may be carried out by the control system including the controller in combination with the various sensors, actuators, and other hardware described herein. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the disconnect and/or vehicle control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a controller of a motorized disconnect assembly of a vehicle that is operable to:
activate a motor to rotate a worm gear coupled to the motor in a first direction in order to engage and rotatably couple a first shaft with a second shaft, the worm gear coupled to a gear track of a first gear of a shifter assembly, the gear track including a plurality of teeth and in communication with a clutch ring adapted to engage with the second shaft; and
activate the motor to continue rotating the worm gear in the first direction in order to disengage the clutch ring from the second shaft and decouple the first shaft and the second shaft, wherein the motor turns the worm gear in only the first direction and wherein the plurality of teeth of the gear track are continuous around an outer circumference of the first gear.

2. The system of claim 1, wherein the controller is in communicative connection with a vehicle controller located external to the motorized disconnect assembly.

3. The system of claim 1, further comprising a control assembly containing the controller, the control assembly including a housing attached to a shifter structure of the motorized disconnect assembly.

4. A system, comprising:
a controller of a motorized disconnect assembly of a vehicle that is operable to:
activate a motor to rotate a worm gear coupled to the motor in a first direction in order to engage and rotatably couple a first shaft with a second shaft, the worm gear coupled to a gear track of a first gear of a shifter assembly, the gear track including a plurality of teeth and in communication with a clutch ring adapted to engage with the second shaft; and
activate the motor to continue rotating the worm gear in the first direction in order to disengage the clutch ring from the second shaft and decouple the first shaft and the second shaft, wherein the clutch ring includes an inner surface including a first set of teeth, a second set of teeth, and a non-toothed section separating the first set of teeth and the second set of teeth.

5. The system of claim 4, wherein the first shaft includes a third set of teeth adapted to mate with the first set of teeth and the second shaft includes a fourth set of teeth adapted to mate with the second set of teeth.

\* \* \* \* \*